(12) United States Patent
Harris et al.

(10) Patent No.: US 8,489,576 B2
(45) Date of Patent: Jul. 16, 2013

(54) METHODS AND APPARATUS FOR USING INFORMATION REGARDING ACTIONS PERFORMED USING TRACEABLE OBJECTS

(75) Inventors: David B. Harris, Wheaton, IL (US); Frederic Herrbach, Chicago, IL (US)

(73) Assignee: Motorola Mobility LLC, Libertyville, IL (US)

( * ) Notice: Subject to any disclaimer, the term of this patent is extended or adjusted under 35 U.S.C. 154(b) by 670 days.

(21) Appl. No.: 12/054,154

(22) Filed: Mar. 24, 2008

(65) Prior Publication Data

US 2009/0112924 A1    Apr. 30, 2009

Related U.S. Application Data

(63) Continuation-in-part of application No. 11/928,760, filed on Oct. 30, 2007.

(51) Int. Cl.
*G06F 7/00* (2006.01)

(52) U.S. Cl.
USPC ............ 707/709; 707/737; 709/224; 709/229

(58) Field of Classification Search
USPC ............ 707/709, 737; 709/224, 229; 726/25; 455/456, 457; 713/167; 382/100
See application file for complete search history.

(56) References Cited

U.S. PATENT DOCUMENTS

| | | | |
|---|---|---|---|
| 5,610,821 A | | 3/1997 | Gazis et al. |
| 5,845,281 A | * | 12/1998 | Benson et al. ........................ 1/1 |
| 6,321,158 B1 | | 11/2001 | DeLorme et al. |
| 7,092,964 B1 | | 8/2006 | Dougherty et al. |
| 7,518,530 B2 | | 4/2009 | Ohno et al. |
| 7,562,387 B2 | * | 7/2009 | Nguyen et al. .................. 726/22 |
| 2001/0010541 A1 | * | 8/2001 | Fernandez et al. ............ 348/143 |
| 2002/0010757 A1 | * | 1/2002 | Granik et al. .................. 709/218 |
| 2002/0019837 A1 | * | 2/2002 | Balnaves ....................... 707/512 |
| 2003/0214760 A1 | * | 11/2003 | Sasaki et al. .................. 360/322 |
| 2004/0054784 A1 | * | 3/2004 | Busch et al. ................... 709/228 |
| 2004/0254942 A1 | * | 12/2004 | Error et al. .................... 707/100 |
| 2006/0178918 A1 | | 8/2006 | Mikurak |

(Continued)

FOREIGN PATENT DOCUMENTS

WO    2005121955 A1    12/2005

OTHER PUBLICATIONS

3GPP, Technical Specification Group Services and System Aspects; Function stage 2 description of Location Services (LCS) (Release 6) 3GPP TS 23.271 V6.13.0 (Sep. 2005).

(Continued)

*Primary Examiner* — Cheyne Ly

(57) ABSTRACT

An embodiment of a communication system includes a client device adapted to receive a traceable object that includes tracer information, and to perform one or more object-related actions using the traceable object. The client device stores the tracer information and object usage information, which describes the one or more object-related actions that have been performed using the traceable object. The client device also sends the stored information to a server. The system also includes the server, which is adapted to receive the object usage information and the tracer information reported by the client device. In an embodiment, the system also includes a service provider adapted to initiate a billing event, which may include generation and transmission of a bill to a sponsor entity based on an evaluation of the object usage information and the tracer information reported by the client device.

29 Claims, 10 Drawing Sheets

700

| ACTION | ACTION TIMESTAMP | TRACER |
|---|---|---|
| ACTION 1 | DATE 1 TIME 1 | **** |
| ACTION 2 | DATE 2 TIME 2 | **** |
| ACTION 3 | DATE 3 TIME 3 | **** |
| | | |
| ACTION N | DATE N TIME N | **** |

704     706     708

U.S. PATENT DOCUMENTS

| | | | |
|---|---|---|---|
| 2006/0182055 | A1 | 8/2006 | Coffee et al. |
| 2006/0234727 | A1 | 10/2006 | Ashley, Jr. et al. |
| 2006/0247849 | A1 | 11/2006 | Mohsini et al. |
| 2006/0265495 | A1* | 11/2006 | Butler et al. ............ 709/224 |
| 2007/0016671 | A1* | 1/2007 | Lee et al. ............... 709/224 |
| 2007/0032947 | A1 | 2/2007 | Yamada et al. |
| 2008/0004958 | A1* | 1/2008 | Ralph et al. ............. 705/14 |
| 2008/0040151 | A1 | 2/2008 | Moore |
| 2008/0147480 | A1* | 6/2008 | Sarma et al. ............. 705/10 |
| 2009/0254572 | A1 | 10/2009 | Redlich et al. |

OTHER PUBLICATIONS

JSR 179 Expert Group, Location API for Java 2 Micro Edition Version 1.0.1, Java Community Press, Feb. 23, 2006.

JSR 293 Expert Group, Location API 2.0 JSR 293, Version .011, Java Community Press, Jul. 2, 2007.

Open Mobile Alliance, OMA Mobile Location Service Architecture, Candidate Version 1.1—OMA-AD-MLS-V1_1-20061020-C, Oct. 20, 2006.

Open Mobile Alliance, Enabler Release Definition for Mobile Location Service (MLS) Candidate Version 1.1—OMA-ERELD-MLS-V1_1-20061020-C, Oct. 20, 2006.

Open Mobile Alliance, Mobile Location Service Requirements, Candidate Version 1.1—OMA-RD-MLS-V1_1-20060906-C, Sep. 6, 2006.

Open Mobile Alliance, Mobile Location Protocol 3.2, Candidate Version 3.2—OMA-TS-MLP-V3_-20051124-C, Nov. 24, 2005.

Open Mobile Alliance, Privacy Checking Protocol, Candidate Version 1.0—OMA-TS-PCP-V1_0-20061020-C, Oct. 20, 2006.

Open Mobile Alliance, Roaming Location Protocol, Candidate Version 1.0—OMA-TS RLP-V1_0-2006511224-C, Nov. 24, 2005.

Cuellar, J., et al., Geopriv Requirements, RFC 3693, The Internet Society, Feb. 2004.

Friedl, M., et al., Diffie-Hellman Group Exchange for the Secure Shell (SSH) Transport Layer Protocol, RFC 4419, The Internet Society, Mar. 2006.

Nokia Corporation, S60 Platform: Landmarks API Specification, Version 1.0 Jul. 11, 2005.

Nokia Corporation, S60 Platform: Landmarks Exchange Format Specification, Version 1.0 Sep. 1, 2005.

Nokia Corporation, S60 Platform: Landmarks Search API Specification, Version 1.0 Jul. 12, 2005.

Nokia Corporation, S60 Platform: Landmarks UI Add/Edit API Specification, Version 1.0 Aug. 29, 2006.

Nokia Corporation, S60 Platform: Landmarks UI Selector API Specification, Version 1.0 Aug. 29, 2006.

Open Mobile Alliance, Mobile Location Protocol (MLP) Document Type Definition Supplement, Version 3.2, 2005.

Nokia Corporation, Landmarks Database Management API Specification, Version 1.0 Jul. 15, 2005.

Nokia Corporation, Location Acquisition API Specification, Version 9.0 Nov. 11, 2004.

Open Mobile Alliance, Roaming Location Protocol (RLP) Document Type Definition Supplement, Version 1.0, 2005.

Open Mobile Alliance, Mobile Location Protocol (MLP) Document Type Definition Supplement, Version 3.0,3.1, 2002.

United States Patent and Trademark Office, "Final Rejection" for U.S. Appl. No. 11/928,760 dated Jul. 13, 2012, 8 pages.

* cited by examiner

600

| | |
|---|---|
| 602 | VERSION ID |
| 606 | PROVIDER ID |
| 608 | SPONSOR ID |
| 610 | SPONSOR TYPE |
| 612 | OBJECT ID |
| 614 | OBJECT INSTANCE ID |
| 616 | CREATION DATE |
| 618 | TRACER PROTECTION INFORMATION |

| ACTION | ACTION TIMESTAMP | TRACER |
|---|---|---|
| ACTION 1 | DATE 1 TIME 1 | **** |
| ACTION 2 | DATE 2 TIME 2 | **** |
| ACTION 3 | DATE 3 TIME 3 | **** |
|  |  |  |
| ACTION N | DATE N TIME N | **** |

| RECORD NO. | DEVICE ID | ACTION | TIMESTAMP(S) | TRACER INFO |
|---|---|---|---|---|
| 1 | DEVICE ID 1 | ACTION 1 | DATE 1 TIME 1 | IDS |
| 2 | DEVICE ID 2 | ACTION 2 | DATE 2 TIME 2 | IDS |
| 3 | DEVICE ID 3 | ACTION 3 | DATE 3 TIME 3 | IDS |
| ... | ... | ... | ... | ... |
| X | DEVICE ID X | ACTION X | DATE X TIME X | IDS |

METHODS AND APPARATUS FOR USING INFORMATION REGARDING ACTIONS PERFORMED USING TRACEABLE OBJECTS

CROSS-REFERENCE TO RELATED APPLICATIONS

This application is a continuation-in-part of co-pending U.S. patent application Ser. No. 11/928,760, filed on Oct. 30, 2007.

TECHNICAL FIELD

The inventive subject matter generally relates to objects upon which actions may be performed in a networked environment, and more particularly to collecting and maintaining information regarding the usage and/or propagation of such objects in and through a network.

BACKGROUND

Various types of transportable objects may be exchanged between devices (e.g., servers, clients, and other nodes) in a client-server communications network. Basically, a "transportable object" is a data entity that may be transported from one network device to another, and that includes identification information (e.g., an object identifier) and some type of information or content.

Information regarding user-initiated actions performed on a transportable object may be valuable to various parties. For example, a service provider who provided the transportable object (or information contained therein) and/or a business entity associated with a transportable object may be interested in knowing whether a user performed some action on the transportable object. This knowledge may enable the service provider and/or business entity better to understand user behavior, to promote use of an object by providing user incentives for certain actions (e.g., sharing an object with other users), and/or may present monetization opportunities, for example. Currently, however, there is no systematic mechanism for determining, with respect to transportable objects provided to a user, whether any user action was taken or what that user action may have been. Accordingly, what are needed are methods and apparatus for a system to obtain information regarding actions that a user has taken on a transportable object. Other features and characteristics of the inventive subject matter will become apparent from the subsequent detailed description and the appended claims, taken in conjunction with the accompanying drawings and this background.

BRIEF DESCRIPTION OF THE DRAWINGS

The inventive subject matter will hereinafter be described in conjunction with the following drawing figures, wherein like numerals denote like elements.

FIG. 6 is a diagram of an object tracer, in accordance with an example embodiment;

FIG. 7 is a diagram of a traceable object usage log, in accordance with an example embodiment;

DETAILED DESCRIPTION

The following detailed description of the inventive subject matter is merely exemplary in nature and is not intended to limit the inventive subject matter or the application and uses of the inventive subject matter. Furthermore, there is no intention to be bound by any theory presented in the preceding background or the following detailed description.

Embodiments include systems that are adapted to provide object-related services to users of "client" devices. More particularly, embodiments include systems, methods, and apparatus for enabling the collection of information regarding actions performed by client devices using "traceable objects" (also referred to herein simply as "objects") that are provided by a system in conjunction with an object-related service. As will be described in detail below, collection of this information is facilitated, in various embodiments, by providing "tracer information" as a part of each traceable object, and by adapting the client devices to store and report, to the system, indications of the actions performed by the client devices using the traceable objects. As will also be described in detail below, the system may evaluate the information reported by the client devices to better determine user behaviors and/or for monetization purposes, in various embodiments.

Figure 1:
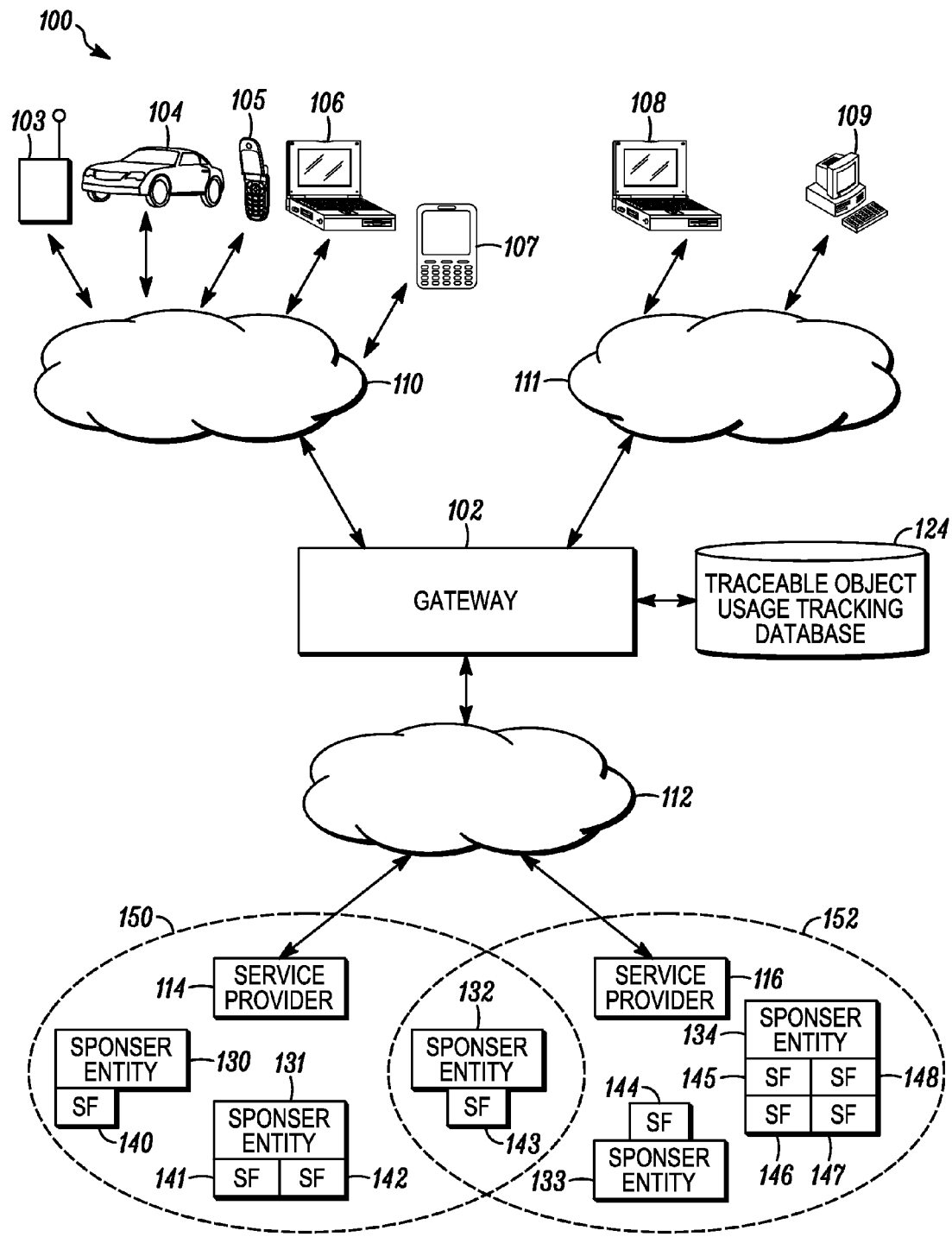
FIG. 1 is a simplified diagram of a communication system adapted to provide one or more services to users of the communication system, in accordance with an example embodiment.

FIG. 1 is a simplified diagram of a communication system 100 adapted to provide one or more object-related services to users of the communication system 100, in accordance with an example embodiment. As used herein, the term "object-related service" means a centralized or distributed software entity adapted to perform, in response to specific requests, one or more processes relating to receiving requests for information or objects, generating or retrieving traceable objects in response to the requests, and providing the traceable objects to client devices. For example, but not by way of limitation, object-related services may include a product, service or information search services, a media search and/or download service, a point-of-interest (POI) search service, a mapping service and/or a navigation service, although other types of services also may be considered to be object-related services. An object-related service may be implemented through a collection of software components (e.g., applications and other programs), which are executed by various system entities. As used herein, the term "application" means a software application that is resident on a system entity (e.g., a client device or a server), and that executes one or more functions available in an object-based service. For example, an application may include client-side and/or server-side portions of the application.

Communication system 100 includes various system entities, which include at least one gateway 102 and a plurality of client devices 103, 104, 105, 106, 107, 108, 109. Communication system 100 also may include one or more service providers 114, 116, each of which may have some type of business relationship with one or more sponsor entities 130, 131, 132, 133, 134. As used herein, the term "system entity" means a software, firmware, hardware or combined entity, which is adapted to communicate with other system entities. A system entity may include an entity that performs processing and/or data storage functions with respect to signals or messages that are communicated between it and one or more other system entities. Gateway 102, client devices 103-109, service providers 114, 116, object usage tracking database 124, and/or portions thereof may be considered "system entities," as that term is used herein. Although the description herein separately describes various processes performed between gateway 102 and service providers 114, 116, it is to be understood that some or all of the processes performed by gateway 102 may be performed by a service provider 114, 116, and vice versa. In addition, although gateway 102 and service providers 114, 116 are illustrated as distinct system entities, these entities may be physically and/or functionally combined, in various embodiments.

Client devices 103-109 may form a portion of any one or more electronic devices selected from a group of devices that includes, but is not limited to, cellular telephones, radios, pagers, personal data assistants (PDAs), personal navigation devices (PNDs), mobile computer systems (e.g., automotive and airplane computer systems), and computers (e.g., laptop, notebook, and desktop computers), to name a few. Client devices 103-109 may be portable or stationary electronic devices, and may be adapted to communicate with networks 110, 111 using various wired and/or wireless communication technologies. In addition, client devices 103-109 are adapted to execute one or more applications, as will be described in more detail below.

Gateway 102 may include one or more computers, data storage devices, and/or other hardware, which are adapted to execute one or more server processes (e.g., "servlets") and/or to store data relevant to server operations. Gateway 102 is adapted to communicate with client devices 103-109 and at least one service provider 114, 116 over one or more wired or wireless networks 110, 111, 112. Networks 110-112 may include, for example, packet switched and/or circuit switched networks, and may further include one or more of the internet, a personal area network (PAN), a local area network (LAN), a wide area network (WAN), a cellular telephone network, a radio network, a satellite communications network, a public switched telephone network (PSTN), and/or any of a variety of other types of networks adapted to enable the interchange of data between various system entities. Networks 110-112 may be adapted to exchange data between the system entities using any of a variety of wired or wireless communications protocols, a discussion of which is outside the scope of the present application. Although three networks 110-112 are illustrated in FIG. 1, more or fewer networks may be included in communication system 100.

In the process of providing object-related services and/or executing object-related applications, "traceable objects" may be produced within communication system 100, and exchanged between system entities. As used herein, the term "traceable object" means a distinct and portable data structure (e.g., a transportable object), which has a defined format that includes or identifies some type of content (e.g., information included within, associated with, or identified by the object), one or more entities (e.g., a provider and/or sponsor entity), and information that enables actions performed on the object to be tracked (e.g., an "object tracer").

Traceable objects may include, for example but not by way of limitation, one or more types of objects selected from a group that includes a traceable media object, a traceable location object, a traceable link object, a traceable advertisement object, a traceable information object, and/or other types of traceable objects according to various embodiments. The "type" of traceable object (e.g., media, location, link, advertisement, information) relates to the type of content included within or identified by the traceable object. A "traceable media object" may include, for example, one or more types of media content (e.g., images, video, music or other media). A "traceable location object" may include, for example, content describing the geographical and/or physical location of an entity (e.g., a sponsor entity, a residence, a physical device or a point-of-interest). A traceable location object may include other information, as well, including a telephone number and entity name, for example. A "traceable link object" may include, for example, a traceable object having content that includes one or more links or uniform resource locators (URLs). A "traceable advertisement object" may include, for example, advertising content (e.g., images, video, audio, URLs) associated with one or more business entities, trademarks, logos, and/or products or services. A "traceable information object" may include, for example, one or more types of informational content (e.g., data and/or types of information other than those previously discussed). Traceable objects may include other types of content, in other embodiments. In addition, although a traceable object may include only a single type of content, a traceable object alternatively may include multiple types of content, as well.

In an embodiment, a traceable object includes information that enables actions performed on the object to be tracked (e.g., an "object tracer"), as mentioned previously. As used herein, the terms "object tracer" and "tracer" refer to a portion of a traceable object that identifies one or more system entities associated with the origin and/or content of the traceable object. As used herein, "tracer information" means the information that is stored within an object tracer. In an embodiment, an object tracer may be "protected" at various times, meaning that the object tracer may be in an encrypted format, or may include some information (e.g., an integrity key) that enables a determination to be made whether the content of the object tracer has been altered by an unauthorized source. Embodiments of traceable objects and object tracers will be described in detail later, in conjunction with FIGS. 5-6.

Referring again to FIG. 1, client devices 103-109 include electronic devices adapted to request information during the process of accessing object-related services through the communication system 100. More particularly, a client device 103-109 is adapted to generate and send, over a network 110, 111, a request for information and/or content to gateway 102. In an embodiment, gateway 102 is adapted to receive information requests from client devices 103-109, obtain traceable and/or other objects corresponding to the requests, and return the traceable and/or other objects to the client devices 103-109. Traceable objects may be provided independently from other information, or traceable objects may be provided as a part of a larger information set (e.g., a web page document, file, or other information set).

In various embodiments, gateway 102 may generate a traceable object itself, or may obtain a traceable object corresponding to an information request from a service provider 114, 116 or other system entity. Generating or obtaining traceable objects may include performing processes (e.g., formulating and/or performing a search) and/or performing data accesses based on the information request. During generation of a traceable object or upon receipt of a traceable object (e.g., from a service provider 114, 116), gateway 102 may add tracer information to the traceable object, and send the server-modified traceable object to the client device 103-109. In an embodiment, gateway 102 may protect the tracer (e.g., through encryption, inclusion of an integrity key, or otherwise) prior to sending the traceable object to a client device 103-109.

Client devices 103-109 are adapted to receive traceable objects from gateway 102 or other system entities (e.g., other client devices 103-109 and/or service providers 114, 116), and to store received traceable objects within the client device's local memory. A client device 103-109 additionally may "use" a received traceable object by performing one or more actions relating to the traceable object. For example, along with the action of storing a traceable object (or the content associated with the traceable object) on the client device 103-109, a client device 103-109 may output the content associated with the traceable object (e.g., display an image or movie and/or output music or sounds), navigate to a web site using a URL included within a traceable object, send the traceable object to another system entity, place a call to an entity identified in a traceable object, map the location of an entity identified in a traceable object, and/or initiate a navigation application to provide driving instructions to an entity identified in a traceable object, among other things.

Client devices 103-109 are adapted to store information regarding their actions performed using traceable objects, along with the tracer information associated with the traceable objects that are used. This information may be referred as "traceable object usage information," which is defined herein as data describing one or more object-related actions that have been performed using one or more traceable objects that are resident on (e.g., received by and stored on) a client device 103-109. Traceable objects may be stored in temporary storage (e.g., volatile memory) and/or persistent storage (e.g., non-volatile memory). As used herein, the term "object-related action" means a system-recognized action performed by a client device 103-109 using a traceable object that is resident on the client device 103-109. In an embodiment, each client device 103-109 that performs an object-related action using the traceable object (or an instance thereof) maintains traceable object usage information for the traceable object. Accordingly, for example, when a first client device (e.g., client device 103) sends a traceable object to a second client device (e.g., client device 104), the first client device may store traceable object usage information for the "send" action, and the second client device may store traceable object usage information for the "receive" action. The first and second client devices may, thereafter, independently store additional traceable object usage information for the shared traceable object each time an object-related action is performed. In other words, the first client device may continue to maintain object usage information for the instance of the traceable object upon which it is performing object-related actions, while the second client device may independently maintain object usage information for the instance of the traceable object upon which it is performing object-related actions. Accordingly, a plurality of client devices simultaneously and independently may be maintaining object usage information for a same traceable object. Examples of various object-related actions will be given later, in conjunction with a discussion of FIG. 3.

Traceable object usage information and tracer information may be stored on a client device 103-109 within a client-side traceable object usage log, in an embodiment. The client-side traceable object usage log may be stored within the client device's local memory, although it may be stored in other accessible locations, in other embodiments. As used herein, the term "client-side traceable object usage log" means a collection of traceable object usage information and tracer information, which is stored on a client device 103-109, and which describes one or more actions that have been performed using one or more traceable objects, along with the tracer information associated with the traceable objects upon which the actions have been performed. In an embodiment, a client-side traceable object usage log includes one or more traceable object usage records, each of which includes information regarding one or more actions performed upon a particular traceable object and the associated tracer information. Embodiments of client-side traceable object usage logs will be described in detail later, in conjunction with FIG. 7.

Along with collecting and storing traceable object usage information and tracer information, a client device 103-109 also may be adapted to report that information to other system entities (e.g., gateway 102). Client devices 103-109 may send client traceable object usage information and tracer information to gateway 102 in response to a request from gateway 102, or in response to some other reporting event, as will be described later. In an embodiment, a client device 103-109 may report traceable object usage information by generating a client traceable object usage report, and sending that report to gateway 102. As used herein, the term "client traceable object usage report" means a collection of traceable object usage information and tracer information retrieved from a client-side traceable object usage log, which is in a message format suitable for sending over a network 110, 111. In an embodiment, a client traceable object usage report may be sent to gateway 102 in the form of one or more messages or data blocks.

In an embodiment, gateway 102 is adapted to receive traceable object usage information and tracer information (e.g., in the form of client traceable object usage reports) from client devices 103-109, and to consolidate the received traceable object usage information and tracer information by storing the received traceable object usage information and tracer information in a traceable object usage tracking database 124. Traceable object usage tracking database 124 may include a centralized or distributed data storage system, and may be implemented on the same or different hardware from gateway 102. In an embodiment, the traceable object usage tracking database 124 is adapted to store consolidated traceable object usage information and tracer information in a server-side traceable object usage log. As used herein, the term "server-side traceable object usage log" means a collection of traceable object usage information and tracer information, which is stored on or accessible to gateway 102, and which describes one or more actions that have been performed upon one or more traceable objects by one or more client devices 103-109, along with the tracer information associated with those traceable objects. A server-side traceable object usage log may be in the form of a relational database or a flat file, in various embodiments.

In an embodiment, gateway 102 is also adapted to send portions of the consolidated traceable object usage information and tracer information to service providers 114, 116 or other system entities. Gateway 102 may send portions of the consolidated traceable object usage information and tracer information to a service provider 114, 116 in response to a request from the service provider 114, 116, or in response to some other reporting event, as will be described later. In an embodiment, gateway 102 may report portions of the consolidated traceable object usage information and tracer information by generating a server traceable object usage report, and sending that report to a service provider 114, 116. As used herein, the term "server traceable object usage report" means a collection of traceable object usage information and tracer information retrieved from a server-side traceable object usage log, which is in a message format suitable for sending over a network 112. In an embodiment, a server traceable object usage report may be sent to a service provider 114, 116 in the form of one or more messages or data blocks.

Service providers 114, 116 include entities that are adapted to generate or obtain traceable objects in response to requests for information from other system entities (e.g., gateway 102 or client devices 103-109). In an embodiment, a service provider 114, 116 is a distinct system entity from the gateway 102. In an alternate embodiment, a service provider 114, 116 and a gateway 102 may be implemented together. In an embodiment, a service provider 114, 116 may include a search engine or other processing algorithm, which is adapted to identify one or more traceable objects based on information within an information request.

Each service provider 114, 116 may have business relationships with one or more sponsor entities 130-134, in an embodiment, as indicated by ovals 150, 152. In an embodiment, this may mean that a service provider 114, 116 and a sponsor entity 130-134 have mutual business obligations (e.g., a contractual relationship), such as a service provider's obligation to provide, for monetary or other compensation, traceable objects for sponsor locations in response to information requests. In another embodiment, a service provider 114, 116 may be more directly related to a sponsor. For example, a service provider 114, 116 may include a server adapted to host a sponsor entity's website and to provide traceable objects associated with the sponsor entity in response to information requests received through the website.

As used herein, the terms "sponsor entity" and "sponsor" mean a business entity that provides (e.g., sells or licenses) products and/or services, typically but not essentially for compensation. A business entity may be located at and/or have a business interest in one or more sponsor facilities (SF) 140, 141, 142, 143, 144, 145, 146, 147, 148, where a physical location of a sponsor facility 140-148 may be represented in a traceable object. As used herein, the term "product" means a tangible product (e.g., a physical item) or an intangible product (e.g., data, electronically represented media, software, and/or files or documents, to name a few). As used herein, the term "sponsor facility" means an actual physical facility (e.g., land areas, edifices, stores, warehouses, restaurants, offices or other non-portable physical objects). In some cases, a sponsor entity 130-134 and a sponsor facility 140-148 may be co-located, and in other cases, a sponsor entity 130-134 and a sponsor facility 140-148 may be distinct entities and/or physically distinct (e.g., a sponsor entity may be a corporation, and sponsor facilities may include multiple retail locations owned by the corporation).

In an embodiment, by virtue of the business relationships between them, each service provider 114, 116 may maintain traceable objects associated with sponsor entities 130-134 and/or sponsor facilities 140-148. Each service provider 114, 116 also may select certain ones of the maintained traceable objects based on information requests received from gateway 102, and may send the selected traceable objects to gateway 102 in response to the requests.

Several examples of the functionality of communication system 100 for different types of traceable objects are now provided. It is to be understood that the examples described below are not exhaustive, and that other types of traceable objects and actions performed thereupon may be implemented in other embodiments. A first example of the functionality of communication system 100 follows, which pertains to actions performed on a traceable media object. Assume a user of a client device 103-109 wants to download a song onto the client device 103-108. The user may initiate an application on the client device 103-109, which is adapted to enable the user to enter the criteria identifying the song. The application may then generate a request for the song, and the client device 103-109 may send the request to gateway 102. Gateway 102 may, in turn, send a request to a service provider 114, 116, which is adapted to determine a traceable media object associated with the song. The service provider 114, 116 may then send the traceable media object to the gateway 102, and the gateway 102 may send the traceable media object to the client device 103-109.

The client device 103-109 may store the traceable media object and/or its content, and then may perform one or more additional actions with respect to the object. One action that the client device 103-109 may take is to output the song on an audio device. Another action that the client device 103-109 may take is to send the song to another network-connected or other device.

A second example of the functionality of communication system 100 follows, which pertains to actions performed on a traceable advertising object and/or a traceable link object. Assume a user of a client device 103-109 wants to access a web page, and the web page includes a traceable advertising object (e.g., an object that renders as a coupon type of advertisement) and a traceable link object (e.g., an object that includes link to another web page). The user may initiate an application (e.g., a browser) on the client device 103-109, which is adapted to enable the user to identify the web site. The application may then generate a request for a web page associated with the web site, and the client device 103-109 may send the request to gateway 102. Gateway 102 may, in turn, send a request to a service provider 114, 116, which is adapted to send the web page document, the traceable advertisement object, and the traceable link object, to the gateway 102. The gateway 102 may send the web page document, the traceable advertisement object, and the traceable link object to the client device 103-109.

The client device 103-109 may store the traceable advertisement object and the traceable link object, and then may perform one or more additional actions with respect to the objects. Upon rendering the web page on the client device 103-109, one action that the client device 103-109 may take, in response to a user input (e.g., a mouse click on the page element corresponding to the traceable advertisement object or the traceable link object) is to initiate navigation to a web site associated with the selected traceable object.

A third example of the functionality of communication system 100 follows, which pertains to actions performed on a traceable location object. Assume a user of a client device 103-109 wants to obtain location information for gas stations located within a five mile radius of the user's current location (i.e., the client device's current location). The user may initiate a location application on the client device 103-109, which is adapted to enable the user to enter the search criteria. The location application may then generate a request for location information, and the client device 103-109 may send the location information request to gateway 102. Gateway 102 may, in turn, send a location information request to a service provider 114, 116, which is adapted to determine one or more traceable location objects associated with sponsor facilities 140-148 that meet the search criteria (e.g., gas stations within a five mile radius of the client device's current location). The service provider 114, 116 may then send the traceable location objects to the gateway 102, and the gateway 102 may send the traceable location objects to the client device 103-109.

The client device 103-109 may store the traceable location objects, and then may perform one or more additional actions with respect to one or more of the traceable location objects. Assume, for example, that the client device 103-109 received four traceable location objects in response to its initial location information request, and each traceable location object includes the name and location of a different gas station. One action that the client device 103-109 may take is to display a list of the gas stations, with each item of the list corresponding to one of the four received traceable location objects. Another action that the client device 103-109 may take, via a mapping application, is to display a map that indicates the locations of each of the gas stations. Another action that the client device 103-109 may take, in response to user inputs, is to initiate a phone call to one of the gas stations using a telephone number included within the traceable location object for that gas station. Yet another action that the client device 103-109 may take, via a navigation application, is to provide navigation instructions to instruct the user how to navigate to one of the gas stations. Ultimately, the navigation application may issue an arrival instruction if and when the navigation application determines that the user has arrived at the gas station.

Service providers 114, 116 and sponsor entities 130-134 may be interested in obtaining information regarding the use, by client devices 103-109, of traceable objects which the service providers 114, 116 have provided. This information may be useful, for example, in determining user behavior, in promoting usage of traceable objects by providing incentives for users to perform certain actions (e.g., sharing and/or otherwise using a traceable object), and/or for monetizing the use of traceable objects.

For example, if a service provider 114, 116 had knowledge that a user has initiated the performance of an action upon (e.g., has "used") a particular traceable object, the service provider 114, 116 may be able to charge a predetermined and/or negotiated fee to the sponsor entity 130-134 and/or to the user or owner of the client device 103-109 based on the type of action performed, the type and/or cost of any product or service associated with the traceable object, the sponsor entity 130-134, and/or the type of sponsor facility 140-148 associated with or represented in the traceable object. For example, when an action involves merely storing a traceable object on a client device 103-109, a first fee (or no fee) may be charged. Alternatively, when an action involves receiving an arrival instruction from a navigation application, which implies that the user actually has gone to a sponsor facility 140-148 represented in a traceable object, another fee may be charged. As yet another alternative, when an action involves the user navigating to a web site associated with a sponsor entity 130-134, another fee may be charged. In addition, a service provider 114, 116 may have a first fee schedule for a first sponsor entity 130-134 or a first type of sponsor facility 140-148 (e.g., a fast food restaurant) and a second, higher fee schedule for a second sponsor entity 130-134 or a second type of sponsor facility 140-148 (e.g., a luxury car dealership).

As another example, a service provider 114, 116 may promote usage of traceable objects by providing incentives for users of client devices 103-109 to perform various actions with the traceable objects. In a particular embodiment, one or more system entities (e.g., a user device 103-109, gateway 102, a service provider 114, 116, and/or another system entity) may maintain (e.g., store and update) a usage credit value for a client device 103-109 (or a plurality of client devices 103-109), where the usage credit value indicates how many usage credits the client device 103-109 has accumulated. The system may increase the usage credit value (e.g., add one or more usage credits) for each action performed by the client device 103-109 on traceable objects to which it has access. The usage credit value may be increased as each user action is performed, and/or may occasionally be increased upon evaluation of stored or reported traceable object usage information (e.g., information stored on a client device 103-109, in a traceable object usage tracking database 124, and/or in memory accessible to a service provider 114, 116 or sponsor entity 130-134). The amount that the usage credit value is increased for each action performed on a traceable object may vary depending on the type of action performed, the type of traceable object, the type and/or cost of any product or service associated with the traceable object, the user, the user device 103-109, the sponsor entity 130-134, and/or the type of sponsor facility 140-148 associated with or represented in the traceable object. For example, when an action involves downloading a traceable object to a client device, the usage credit value may be increased by a first amount (e.g., 5 credits). Alternatively, when an action involves sending a traceable object to another client device (e.g., "sharing" the traceable object), the usage credit value may be increased by a second amount (e.g., 10 credits).

In addition, a user and/or the system may initiate certain redemption actions, and the usage credit value may be decreased for each redemption action performed. A redemption action may be an action that is performed in which one or more usage credits are exchanged for an incentive of some type. In other words, a usage credit value may be decreased by an amount in exchange for an incentive provided to the user (or other person or entity). For example but not by way of limitation, incentives may include monetary awards, charitable donations, discounts on products or services, coupons, product or service upgrades, product or service prizes (e.g., a free cup of coffee, a month of free email service, etc.), transportable objects (e.g., ringtones, songs, video clips), and/or other items that may be perceived as having value.

Figure 2:
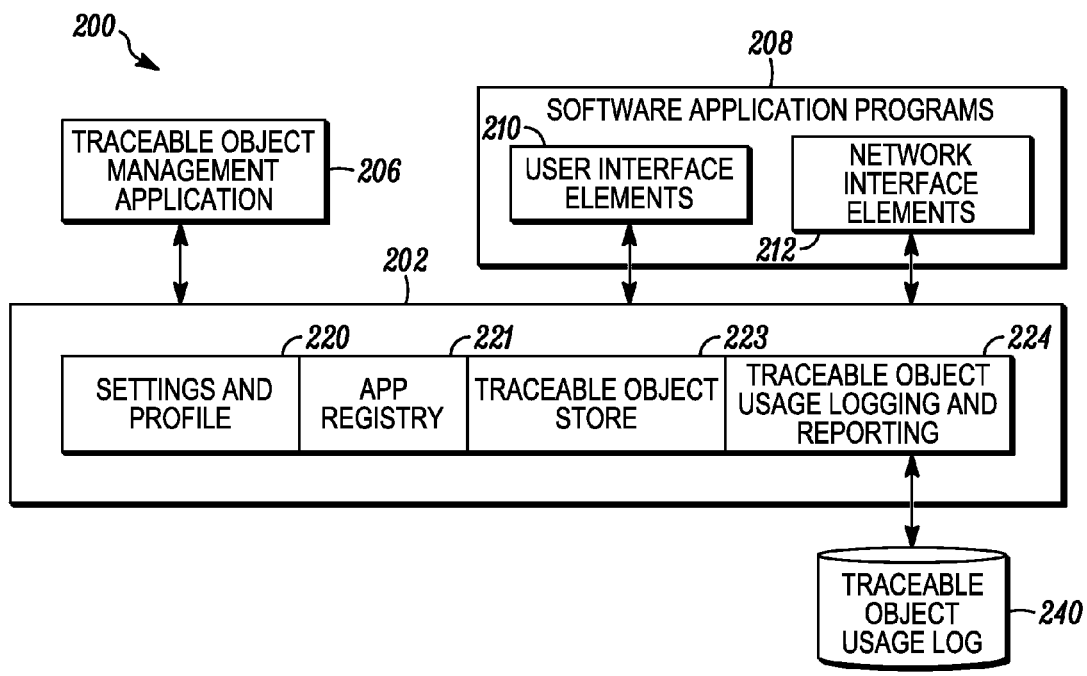
FIG. 2 is a functional block diagram of a client-side software architecture adapted to store traceable object usage information and tracer information, and to report traceable object usage information and tracer information, in accordance with an example embodiment.
Figure 12:
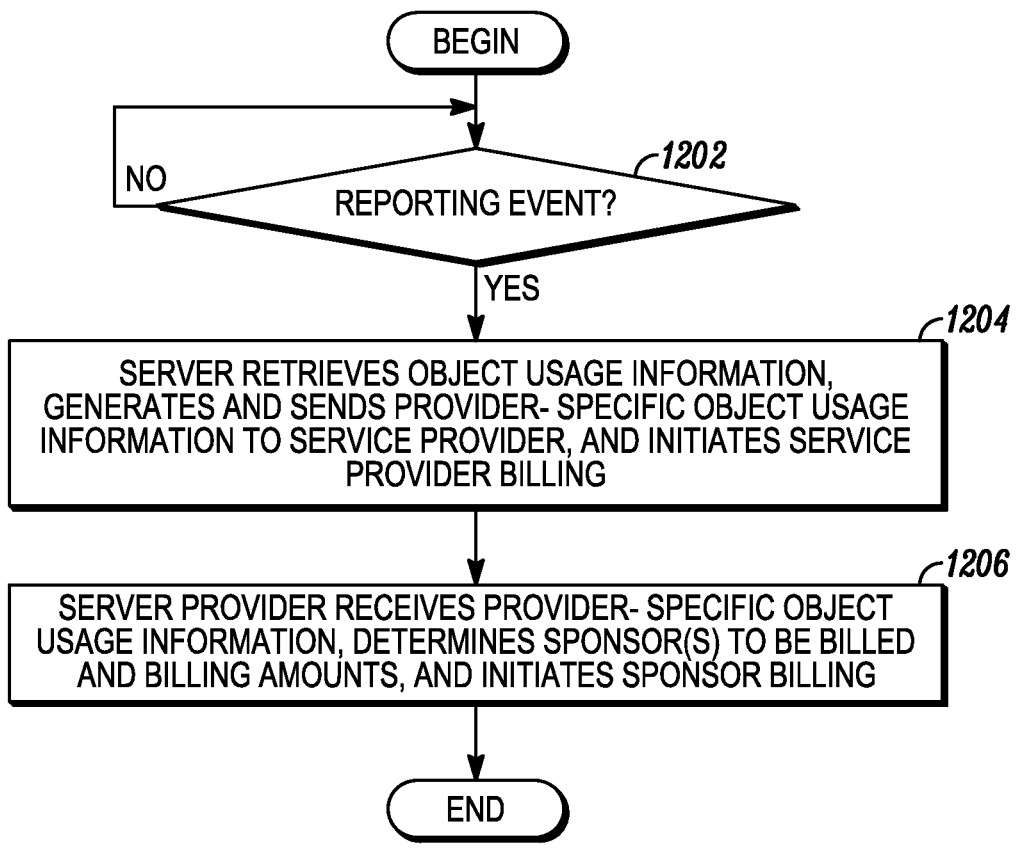
FIG. 12 is a flowchart of a method for a server to provide information to a service provider, which describes object-related actions performed by one or more client devices, in accordance with an example embodiment.
Figure 13:
FIG. 13 is an example of a tiered billing schedule that may be applied by a service provider billing processor, in accordance with an example embodiment.
Figure 14:
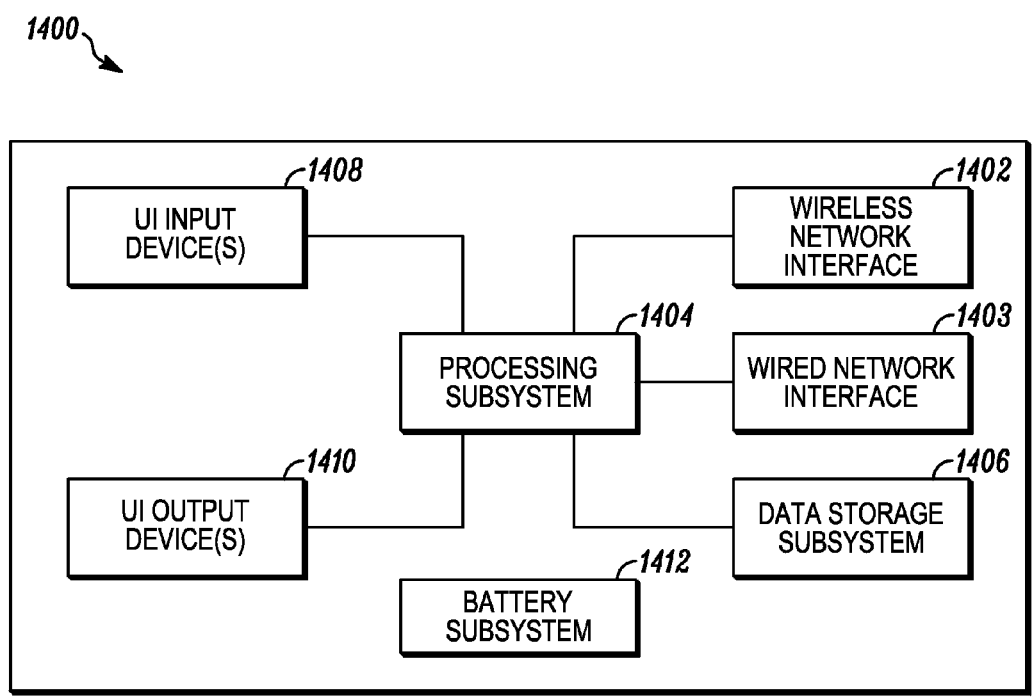
FIG. 14 is a simplified block diagram of a client device, in accordance with an example embodiment.

Additional details regarding various embodiments will now be described. More particularly, FIG. 2 is a functional block diagram of a client-side software architecture, in accordance with an example embodiment. FIGS. 3-7 illustrate additional details regarding a client device obtaining traceable objects and logging traceable object usage. FIGS. 8-11 illustrate additional details regarding a client device reporting traceable object usage to a server, and FIGS. 12-13 illustrate additional details regarding a server reporting traceable object usage to a service provider or other entity, and either or both the server or the service provider initiating billing events. Finally, FIG. 14 illustrates a simplified block diagram of a client device.

FIG. 2 is a functional block diagram of a client-side software architecture 200 adapted to store traceable object usage information and tracer information, and report traceable object usage information and tracer information, in accordance with an example embodiment. Executable code associated with elements of software architecture 200 may be stored within one or more memory subsystems of a client device, and executed by one or more processing subsystems of the client device, in an embodiment.

Software architecture 200 includes a core component 202 adapted to provide features relating to various client services, as will be explained in more detail below. In addition, in an embodiment, software architecture 200 includes various "peripheral components," which interface with core component 202. These peripheral components include, in an embodiment, a traceable object management application 206 and one or more software application programs 208, at least some of which are adapted to process traceable objects. In an embodiment, software architecture 200 also may include a location engine (not illustrated), which includes hardware, firmware, and/or software adapted to determine a current location of the client device.

Traceable object management application 206 includes a software application adapted to provide the means (e.g., interactive display screens) for a user of the client device to access and initiate various functions relating to traceable objects. For example, but not by way of limitation, traceable object management application 206 may cause the client device to display a screen that includes a menu of selectable options relating to traceable objects. These options may include, for example, options to save a traceable object on the client device in persistent storage ("save option"), to view details of a traceable object ("view option"), to edit a traceable object ("edit option"), to output content (e.g., media content) associated with the traceable object on the client device ("play option"), to navigate to a web site associated with or represented in the content of a traceable object ("web navigate option"), to display a map to a location represented in a traceable object ("map option"), and/or to send a traceable object to another system entity ("send option"). Traceable object management application 206 also may enable a user to select a saved traceable object, and to initiate the performance of an object-related action on the selected traceable object, in an embodiment. For example, when a user selects a traceable location object, traceable object management application 206 may initiate execution of a client-side location application, and may pass the selected traceable location object (or a pointer or address thereto) to the application. As another example, when a user selects a traceable media object, traceable object management application 206 may initiate execution of a client-side media application adapted to output the media content (e.g., to a display and/or speaker), and may pass the selected traceable media object (or a pointer or address thereto) to the application. In addition, traceable object management application 204 may provide one or more other features or selectable options, which may be displayed in conjunction with the menu or may be selectable through the menu. Additional features may include, for example, setup features (e.g., enables the displays to be customized), information management features (e.g., enabling information and/or traceable objects to be organized and/or characterized), usage credit management features (e.g., enabling usage credit values to be viewed and/or enabling usage credits to be redeemed for incentives), and/or information display features (e.g., enabling subsets of information and/or traceable objects to be displayed, such as "recent songs," for example).

Software application programs 208 include one or more executable software programs, at least some of which are adapted to provide a user interface, and to receive, send, store, and/or process traceable objects. For example, but not by way of limitation, software application programs 208 may include one or more of a browser application, an audio player application, a video player application, a mapping application, a search application, a point-to-point direction application, a navigation application, a geocoding application, a reverse geocoding application, a contacts application, a messaging application (e.g., a short message service (SMS) application and/or a multimedia messaging service (MMS) application), other third-party provider applications, and/or other applications.

In an embodiment, at least some of software application programs 208 may include user interface (UI) elements 210 and network interface elements 212. UI elements 210 include portions of the software application programs 208, which produce the means for a user of the client device to view and enter information through the user interface (e.g., the display, touchscreen, pointing device, keypad, speaker, and microphone, for example). Network interface elements 212 include portions of the software application programs 208, which facilitate communication between the client device and a server (e.g., gateway 102, FIG. 1) over a network with which the client device communicates. Communication with a server may be performed, for example, to send traceable objects to the server, to receive traceable objects from the server, to send traceable object usage information and tracer information to the server, to send or receive other client-server communications, and/or to invoke the server to perform certain functions of a service (e.g., computationally intensive and/or memory intensive functions) and to return results of the server-performed functions back to the client device (e.g., search results, maps, web page documents, or other results). Network interface elements 212 also may facilitate communication between the client device and other client devices, for example, when traceable objects are being shared between the client devices (e.g., using a messaging application such as SMS and/or MMS). Although segmentation of a software application 208 into a UI element 210 and a network interface element 212 is not essential, such segmentation may enable the software application 208 to be more easily modified to comply with the user interface requirements specified by different service providers, wireless carriers, and/or device manufacturers. For example, in order to comply with the user interface requirements of a particular service provider, wireless carrier, and/or device manufacturer, a software application programmer may design the UI element 210 of a software application 208, without affecting the network interface element 212. In addition, segmentation may enable a software application 208 to be more easily modified to communicate over various networks. For example, in order to communicate according to a protocol that is compatible with a particular network, a software application programmer may design the network interface element 212 of a software application 208, without affecting the UI element 210.

As mentioned previously, object management application 206 and software application programs 208 are adapted to interface with core component 202. Core component 202 may be a platform-independent entity, which may be executed in conjunction with a variety of different operating systems on a variety of different types of client devices. In an embodiment, core component 202 includes or is adapted to call various features, including a settings and profile feature 220, an application registry feature 221, a traceable object store feature 223, and a traceable object support feature 224. Each of these features 220, 221, 223, 224 is an element of core component 202, in an embodiment. In other embodiments, any one or more of features 220, 221, 223, 224 may be implemented in software programs that are distinct from core component 202, and/or may be excluded altogether. In still other embodiments, any one or more of features 220, 221, 223, 224 may be combined together.

Settings and profile feature 220 is adapted to maintain settings and profile information, and in some cases, to facilitate editing of settings and profile information. For example, settings and profile feature 220 may be adapted to interface with traceable object management application 204 and/or software application programs 208 to provide and/or update settings and/or profile information. Settings may include, among other things, information that enables the network interface elements 212 of the software application programs 208 to communicate with a server adapted to provide services (e.g., a uniform resource locator for gateway 102, FIG. 1). Profile information may include, among other things, search preference parameters that may be specified by a user. For example, profile information may include default search settings and preferences, among other things.

Application (APP) registry feature 221 is adapted to enable applications (e.g., software application programs 208) to register themselves with the core functionality (e.g., to make themselves "known" to the core functionality). In addition, application registry feature 221 facilitates intercommunication (e.g., of traceable objects) between registered applications. For example, in an embodiment, the application registry feature 221 may enable a messaging application, which has received an SMS message that includes a traceable object, to pass the traceable object to an audio player application, which may then cause a song represented in the traceable object to be output on a speaker.

Traceable object store feature 223 is adapted to store traceable objects that are received by the client device in the client device's non-volatile memory, and to retrieve and provide previously stored traceable objects when they are requested by a software application program 208 or other software component of the client device. In an embodiment, a user also may initiate access to traceable objects by manipulating the user interface provided by traceable object management application 204, for example. Once accessed, the user may "use" the traceable object by initiating, through the user interface, further actions to be performed with respect to the traceable object.

Traceable object usage logging and reporting feature 224 is adapted to log the usage of traceable objects by storing information regarding the usage (e.g., traceable object usage information and tracer information) in traceable object usage log 240. In addition, in an embodiment, traceable object usage logging and reporting feature 224 is adapted to report the traceable object usage to a server (e.g., gateway 102, FIG. 1), by retrieving traceable object usage information and tracer information from the traceable object usage log 240, and generating and sending client traceable object usage reports over the network. In an embodiment, traceable object usage log 240 includes a buffer, which includes traceable object usage information and tracer information for one or more traceable objects that have been received by the client device.

In an embodiment, a client device also may store and maintain (e.g., increase or decrease) a usage credit value, as described previously. In such an embodiment, the client device may include non-volatile storage (not illustrated) for storing the usage credit value. In alternate embodiments, other system entities (e.g., gateway 102, service providers 114, 116, and/or sponsor entities 130-134, FIG. 1) also or alternatively may store and/or maintain a usage credit value for the client device.

Figure 3:
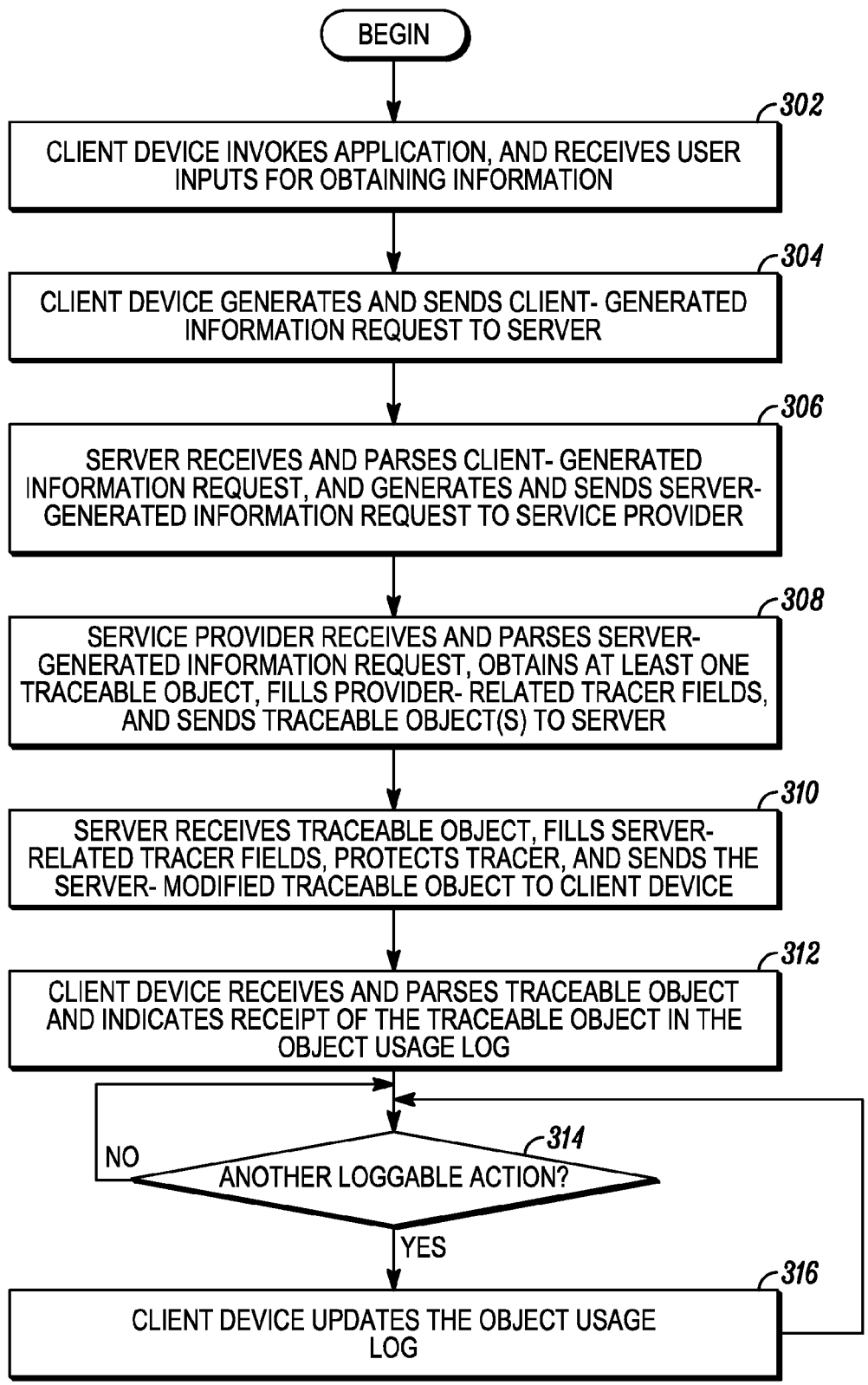
FIG. 3 is a flowchart of a method for requesting object-related information, generating and returning traceable objects, and logging traceable object usage, in accordance with an example embodiment.

FIGS. 3-7 illustrate additional details regarding a client device obtaining traceable objects and logging traceable object usage. More particularly, FIG. 3 is a flowchart of a method for requesting information, generating and returning traceable objects, and logging traceable object usage, in accordance with an example embodiment. For enhanced understanding, FIG. 3 should be viewed in conjunction with FIG. 4, which is a communication flow diagram illustrating messages exchanged between system entities during the process of obtaining a traceable object, in accordance with an example embodiment.

Referring first to FIG. 3, the method may begin, in block 302, when a client device invokes a software application (e.g., traceable object management application 204 and/or software application program 208, FIG. 2), which is adapted to provide a client-side portion of a service. Such an application may be referred to generally herein as a service application. In an embodiment, the software application may include a user interface element (e.g., UI element 210, FIG. 2), which may provide one or more user interface prompts adapted to enable the user to input or indicate parameters for obtaining information. The software application may receive the user-specific parameters through the provided user interface. Using a previously given example, a user may invoke a search application directly or through another program (e.g., traceable object management program 204, FIG. 2), and may input parameters that specify that the user would like a song to be downloaded to the client device.

In block 304, the client device generates a client-generated information request, which indicates the parameters. The client device may then send the client-generated location information request to a server (e.g., gateway 102, FIG. 1), as indicated by client-generated information request message 402 (FIG. 4) being sent from a client device to a server.

In an embodiment, in block 306, the server receives and parses the client-generated information request. The server may be adapted to act as a proxy, and to perform some computational or data intensive functions related to the service for which the information request relates. In addition, the server may be adapted to generate or retrieve traceable objects that may fulfill the request. However, if the server is not able to generate or retrieve traceable objects that may fulfill the request, the server may generate and send a server-generated information request to a service provider (e.g., service provider 114, 116, FIG. 1) or other system entity which is adapted to generate or retrieve such traceable objects. The server-generated information request, which is indicated by server-generated information request message 404 (FIG. 4) may include substantively the same parameters as the client-generated information request, although the format of the server-generated information request should be consistent with the network and messaging protocols for communication between the server and a service provider.

In block 308, the service provider receives and parses the server-generated information request, and obtains at least one traceable object that fulfills the request, in an embodiment. In some cases, the service provider may generate the traceable objects, and in other cases, the service provider may obtain the traceable objects from other sources. As discussed previously, a traceable object includes content and, in an embodiment, also includes an object tracer, which includes tracer information that identifies one or more system entities associated with the origin and/or content of the traceable object. Along with content and tracer information, a traceable object may include other information, as well.

Figure 5:
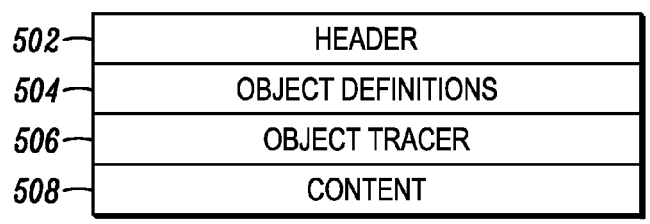
FIG. 5 is a diagram of a traceable object, in accordance with an example embodiment.

FIG. 5 is a diagram of a traceable object 500, in accordance with an example embodiment. In an embodiment, traceable object 500 is a data entity that includes one or more content fields (e.g., content field 508) and an object tracer 506. In various other embodiments, object 500 may include one or more additional fields, such as a header field 502 and object definitions field 504, for example. In other embodiments, traceable object 500 may include more, fewer or different fields. An entity that generates a traceable object (e.g., establishes the traceable object as a data entity and inserts data in at least the header field 502, object definitions field 504, and content field 508) is referred to herein as a "content provider." A content provider may be, for example, a service provider (e.g., service provider 114, 116, FIG. 1), a server (e.g., gateway 102, FIG. 1), a client device (e.g., client device 103-109, FIG. 1), a processing system associated with a sponsor entity (e.g., sponsor entity 130-134, FIG. 1), or another system entity.

Header field 502 may include, for example, information that enables a processing element to determine the type of entity that traceable object 500 is, and may additionally include information regarding the size and format of traceable object 500, among other things. Object definitions field 504 may include an indication of a unique or non-unique name of the entity (e.g., the business entity or the individual name) associated with traceable object 500. Object tracer 506 includes a protected or unprotected tracer, which as described previously, identifies one or more system entities associated with the origin and/or content of traceable object 500. Finally, content field 508 may include any one or more types of content that includes media content (e.g., digital images, video, and/or audio), links (e.g., URLs), location information, advertisements, documents, data, and/or other types of content. Although FIG. 5 illustrates a traceable object having particular fields arranged in a particular order, it is to be understood that, in other embodiments, a traceable object may have a substantially different format from that illustrated in FIG. 5. For example, but not by way of limitation, a traceable object may have a format selected from a group that includes, but is not limited to, V-card, XML (Extensible Markup Language), XMF (Extensible Music Format), WAV (Waveform audio format), AIFF (Audio Interchange File Format), AVI (Audio Video Interleave), MPEG (Moving Picture Experts Group), MPEG-4, ASF (Advanced Systems Format), WMV (Windows Media Video), WMA (Windows Media Audio), 3GP, QuickTime (.mov file), RealMedia, RealVideo, RealAudio, .dat file, JPEG (Joint Photographic Experts Group), MJPEG (Motion JPEG), Ogg, Flash Video, MKV (Matroska Multimedia Container), IFF (Interchange File Format), Flexible Image Transport System, and TIFF (Tagged Image File Format), among others.

FIG. 6 is a diagram of an object tracer 600, in accordance with an example embodiment. In an embodiment, object tracer 600 includes at least a provider identification (ID) field 606, a sponsor ID field 608, and an object ID field 612. In various other embodiments, object tracer 600 may include one or more of a version ID field 602, a sponsor type field 610, an object instance ID field 614, a creation date field 616, and one or more tracer protection information fields 618. Each of these fields will briefly be described below.

Version ID field 602 may include version information (e.g., a version number) indicating the "version" of the tracer structure and/or tracer processing requirements. For example, the system may be adapted to implement various tracer structures, each potentially having different sizes, different fields, different arrangements of fields, and/or different field characteristics (e.g., data formats). In an embodiment, the server (e.g., gateway 102, FIG. 1) or another system entity (e.g., a service provider 114, 116, FIG. 1) may enter data into this field to indicate the version of the tracer 600. This information, when later accessed, enables a system entity to determine how to parse the tracer 600, and/or may indicate other characteristics of the tracer 600 (e.g., whether or not encryption or other forms of protection have been applied to the tracer), which affect the way that the tracer 600 is generated and/or processed. In an embodiment, version information is stored in version ID field 602 by a server (e.g., gateway 102, FIG. 1), although it alternatively may be stored by a service provider (e.g., service provider 114, 116, FIG. 1), a content provider or another system entity. Desirably, the version ID field 602 is not encrypted, in an embodiment in which other portions of tracer 600 are encrypted. In an alternate embodiment, the version ID field 602 may be encrypted.

Provider ID field 606 may include a provider ID, which identifies an entity (e.g., a service provider 114, 116, FIG. 1) from which the traceable object was obtained. In some cases, the entity identified in the provider ID field 606 may actually generate the traceable object. In other cases, the entity identified in the provider ID field 606 may retrieve the traceable object from another system entity and/or from a database. In an embodiment, a provider ID is stored in provider ID field 606 by a server (e.g., gateway 102, FIG. 1), although it alternatively may be stored by a service provider (e.g., service provider 114, 116, FIG. 1), a content provider or another system entity. Desirably, the provider ID field 606 is encrypted, in an embodiment in which portions of tracer 600 are protected using encryption. In an alternate embodiment, the provider ID field 606 may not be encrypted.

Sponsor ID field 608 may include a sponsor ID, which identifies a sponsor entity (e.g., a sponsor entity 130-134, FIG. 1) having or associated with a sponsor asset such as a trademark, logo, product, service, web site, sponsor facility (e.g., a sponsor facility 140-148, FIG. 1) or other tangible or intangible asset that may be represented in the content (e.g., content 508, FIG. 5) of the traceable object. In an embodiment, a sponsor ID is stored in sponsor ID field 608 by a content provider, although it alternatively may be stored by a server (e.g., gateway 102, FIG. 1), a service provider (e.g., service provider 114, 116, FIG. 1) or another system entity. Desirably, the sponsor ID field 608 is encrypted, in an embodiment in which portions of tracer 600 are protected using encryption. In an alternate embodiment, the sponsor ID field 608 may not be encrypted.

Sponsor type field 610 may include a sponsor type indicator, which provides for classifying the sponsor entity (e.g., a sponsor entity 130-134, FIG. 1) and/or sponsor asset (e.g., a sponsor facility 140-148, FIG. 1) associated with or represented in the content of the tangible object. In an embodiment, as will be described later, monetization opportunities that include billing sponsor entities based on object-related actions performed by client devices may determine billing amounts based on the type of sponsor entity and/or the type of sponsor asset. In an embodiment, a type indicator is stored in sponsor type field 610 by a service provider (e.g., service provider 114, 116, FIG. 1), although it alternatively may be stored by a server (e.g., gateway 102, FIG. 1), a content provider or another system entity. Desirably, the sponsor type field 610 is encrypted, in an embodiment in which portions of tracer 600 are protected using encryption. In an alternate embodiment, the sponsor type field 610 may not be encrypted.

Object ID field 612 may include a object ID, which enables a determination of which particular sponsor asset or assets (e.g., sponsor facility 140-148, FIG. 1) the content within the traceable object pertains. Accordingly, an object ID may be unique for different sponsor assets. In an embodiment, an object ID is stored in object ID field 612 by a content provider, although it alternatively may be stored by a server (e.g., gateway 102, FIG. 1), a service provider (e.g., service provider 114, 116, FIG. 1) or another system entity. Desirably, the object ID field 612 is encrypted, in an embodiment in which portions of tracer 600 are protected using encryption. In an alternate embodiment, the object ID field 612 may not be encrypted.

Object instance ID field 614 may include an object instance ID, which uniquely identifies the particular instance of the traceable object. In an embodiment, an object instance ID is stored in object instance ID field 614 by a service provider (e.g., service provider 114, 116, FIG. 1), although it alternatively may be stored by a server (e.g., gateway 102, FIG. 1) or another system entity. Desirably, the object instance ID field 614 is encrypted, in an embodiment in which portions of tracer 600 are protected using encryption. In an alternate embodiment, the object instance ID field 614 may not be encrypted.

Creation date field 616 may include an object instance timestamp, which indicates when the object instance was created (or some subsequent time). In an embodiment, an object instance timestamp is stored in creation date field 616 by a service provider (e.g., service provider 114, 116, FIG. 1), although it alternatively may be stored by a server (e.g., gateway 102, FIG. 1) or another system entity. Desirably, the creation date field 616 is encrypted, in an embodiment in which portions of tracer 600 are protected using encryption. In an alternate embodiment, the creation date field 616 may not be encrypted. In still another alternate embodiment, the object instance timestamp may be stored in the object instance ID field 614, and a separate creation date field 616 may be excluded.

Tracer protection information field 618 may include information that enables the tracer 600 or portions thereof to be "protected." In one embodiment, the tracer protection information field 618 may include an integrity key and/or checksum, which is calculated based on the contents of one or more other tracer fields, and which enables a later determination of whether or not those tracer fields have been modified. In another embodiment, the tracer protection information field 618 may also or alternatively include an encryption key identifier, which includes or identifies an encryption key that was used to encrypt one or more other tracer fields, thus enabling later decryption of those tracer fields. In other embodiments, a tracer may be sent "in the clear" (e.g., unprotected), and the tracer protection information field 618 may be excluded. In an embodiment, tracer protection information (e.g., an integrity key, checksum, encryption key, or other information) is stored in tracer protection information field 618 by a system entity that applies the protection, such as a server (e.g., gateway 102, FIG. 1), although it alternatively may be stored by a service provider (e.g., service provider 114, 116, FIG. 1) or another system entity. Desirably, the tracer protection information field 618 is not encrypted, in an embodiment in which portions of tracer 600 are protected using encryption.

The object tracer 600 of FIG. 6 is illustrated in an unencrypted format. It is to be understood that, in embodiments in which the tracer is encrypted (or otherwise scrambled or compressed), the information included within the tracer fields may not be arranged in a sequential order. In addition, it is to be understood that the various fields may be arranged in different orders than that illustrated, and/or certain ones of the fields may be combined together, and/or data within a single field may be represented in multiple fields, and/or more, fewer and/or different fields may be included within a tracer.

Referring also to FIG. 3 and block 308, upon generating or retrieving a traceable object, the service provider may then fill certain provider-related tracer fields by adding data to those tracer fields, as described previously in conjunction with FIG. 6. The service provider may then send the traceable object (with the tracer) to the server, as indicated by object with tracer message 406 (FIG. 6).

Figure 4:
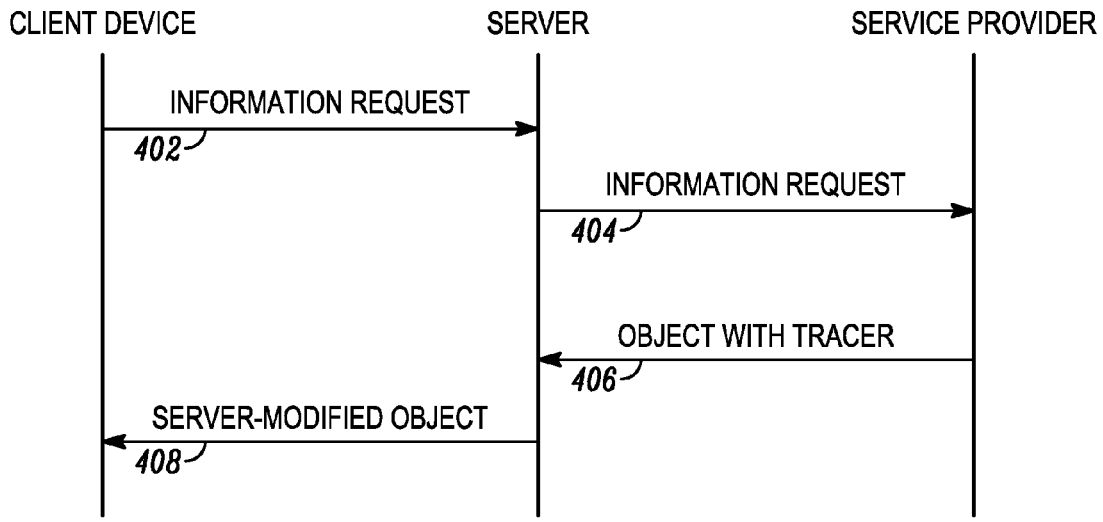
FIG. 4 is a communication flow diagram illustrating messages exchanged between system entities during the process of obtaining a traceable object, in accordance with an example embodiment.

In block 310, the server receives the traceable object from the service provider. In an embodiment, the server may then fill certain server-related tracer fields by adding data to those tracer fields, as described previously in conjunction with FIG. 6. In an embodiment, the server also may "protect" the tracer and/or portions thereof. In one embodiment, the server may add an integrity key and/or checksum to the tracer (e.g., in tracer protection field 618, FIG. 6), which enables a later determination of whether or not the tracer has been modified. In another embodiment, the server may encrypt the tracer or portions thereof, and may add the encryption key to the tracer (e.g., in tracer protection field 618, FIG. 6). Other means of protecting the tracer may be used, in other embodiments. In another embodiment, however, the tracer may not be protected, but rather may be sent "in the clear." Upon completing modifications to the tracer (e.g., filling various tracer fields and/or protecting the tracer), the server sends the server-modified traceable object to the client device, as indicated by server-modified object message 408 (FIG. 4).

In block 312, the client device receives and parses the server-modified object. The client device may also store the traceable object in temporary or volatile storage. In an embodiment, the client's receipt of the traceable object may be considered a logable, "object-related action." In an embodiment, the action of receiving a traceable object, along with other actions performed with respect to the traceable object, may be documented by the client device in an object usage log, as mentioned previously.

As used herein, an "object-related action" may be defined as an action that is tracked by the system, and that is performed by a client device (e.g., in response to user interface inputs) and/or performed by a client-side application or other software program. In an embodiment, each object-related action that is tracked within a system may have a unique action code associated therewith. Table 1, below, illustrates an example of a table of object-related actions, action codes, and a description of each action that may be tracked by a system according to an example embodiment. It is to be understood that a system may track more, fewer or different actions than those listed in Table 1, in various alternate embodiments. In other words, in other embodiments, more, fewer or different object-related actions may be defined by and recognized within a system.

| Action Code | Action | Description |
| --- | --- | --- |
| 1 | receive | receive object from another system entity |
| 2 | download | download object and/or content |
| 3 | play | output content of object (e.g., audio and/or video) on client device |
| 4 | call | initiate telephone call to a telephone number represented in the object |
| 5 | display | display information or content in object |
| 6 | map | display a map that indicates a physical location |

-continued

| Action Code | Action | Description |
|---|---|---|
| 7 | send | represented in the object<br>send object and/or content in an object to another system entity |
| 8 | save | save object or content in non-volatile memory on the client device |
| 9 | web navigate | navigate to web site represented in the object |
| 10 | purchase | purchase product or service represented in object or offered on a web site represented in object |
| 11 | search | initiate or perform a search algorithm using information in object |
| 12 | physical navigation | initiate an instance of a navigation application to provide navigation instructions to a physical location represented in object |
| 13 | arrival | generate arrival-type navigation alert and/or otherwise determine that the client device has arrived at a physical location represented in object |

In an embodiment in which receipt of a traceable object is a system-recognized, object-related action, the client device may save information regarding the action in an object usage log. In an embodiment, an object usage log is a data structure (e.g., a buffer), stored in non-volatile memory of the client device, which includes information regarding object-related actions performed by the client device with respect to traceable objects that are received by and/or stored on the client device (e.g., the "usage" of received traceable objects). In an embodiment, indicating that an object-related action has occurred (e.g., a receive action) includes generating an entry (e.g., a record) in the object usage log, which includes all or portions of the tracer for the traceable object that was acted upon, along with an indication of the action that was performed (e.g., the object usage information), among other things. In an embodiment in which all of a portion of the tracer is encrypted, the encrypted tracer information may be stored, in the entry, in conjunction with the object usage information. In an embodiment in which the client device maintains a usage credit value, the client device may increase the usage credit value by one or more usage credits for performing the receive (or download) action. In an alternate embodiment, another system entity (e.g., gateway 102, service provider 114, 116, and/or sponsor entity 130-134, FIG. 1) may increase the usage credit value upon performance of the action or in response to receipt and evaluation of object usage information.

The object usage log (and the usage credit value, if it is maintained by the client) may be updated each time the client device performs an object-related action, in an embodiment. Accordingly, a usage log entry (e.g., a record) may be generated in the object usage log each time the client device performs an object-related action. Alternatively, an existing usage log entry corresponding to a particular traceable object may be updated to indicate that an additional action has been performed with respect to that traceable object. As will be described in detail later, the usage information included within an object usage log may be reported to a server (e.g., gateway 102, FIG. 1) either periodically, in response to some reporting event, or both. In an embodiment, a reporting event may be the performance of an object-related action, and a client device may report object-related actions as they occur (e.g., a client device may send information describing an object-related action to the server each time such an action is performed). In such an embodiment, maintenance of an object usage log may or may not be performed.

FIG. 7 is a diagram of an object usage log 700, in accordance with an example embodiment. Object usage log 700 may include multiple records, and each record may correspond to an object-related action, which has been performed by the client device and logged in the object usage log 700. In an embodiment, each record includes a description of the action that was performed within an action field 704, a timestamp within a timestamp field 706, and a copy of all or a portion of the tracer that is associated with the traceable object that was acted upon, within a tracer field 708.

In an embodiment, each time an object-related action is performed, a new record is created in object usage log 700, a then-current time is inserted into the timestamp field 706 of the new record, and all or a portion of the tracer (e.g., tracer 600, FIG. 6) associated with the traceable object that was acted upon is copied into the tracer field 708 of the new record. In another embodiment, if a record has already been created for a particular traceable object, the record may be updated when subsequent object-related actions are performed with respect to the traceable object (e.g., additional actions may be added to the action field 704). In still another embodiment, a record may be created only when a tracer and/or the corresponding traceable object has one or more particular characteristics. For example, when an object-related action is performed, the client device may determine whether the traceable object corresponds to a sponsor entity (e.g., sponsor entity 130-134, FIG. 1), and may bypass creation of a new record when it does not. This determination may be made, for example, by the client device evaluating the information within one or more fields of the tracer (e.g., tracer 600, FIG. 6).

Object-related actions 704 performed by the client device may be stored in the object usage log 700 (or reported to a server or service provider) in a coded format, in an embodiment, although the information may be stored (or reported) in an ASCII format or some other uncompressed format, in other embodiments. For example, as described previously, the system may associate a unique code with each type of object-related action, and the unique codes may be known to the client device and to the server. Referring again to FIG. 3, a determination may be made, in block 314, whether another logable, object-related action has occurred, with respect to an object that was previously received by and/or stored on the client device. This determination may be true, for example, each time the client device performs a system-recognized, object-related action, such as the actions described previously. When the client device has performed another logable, object-based action, the client device may update the object usage log to indicate that the action has been performed, in block 316. In an embodiment, updating the object usage log includes generating an additional entry in the object usage log, which includes the object tracer and an indication of the action that was performed, among other things. In another embodiment, updating the object usage log may include updating a previously-generated entry to indicate that an additional action has been performed. The process of updating the object usage log may continue to be performed indefinitely, as indicated in FIG. 3, or until some interrupt event occurs.

Figure 8:
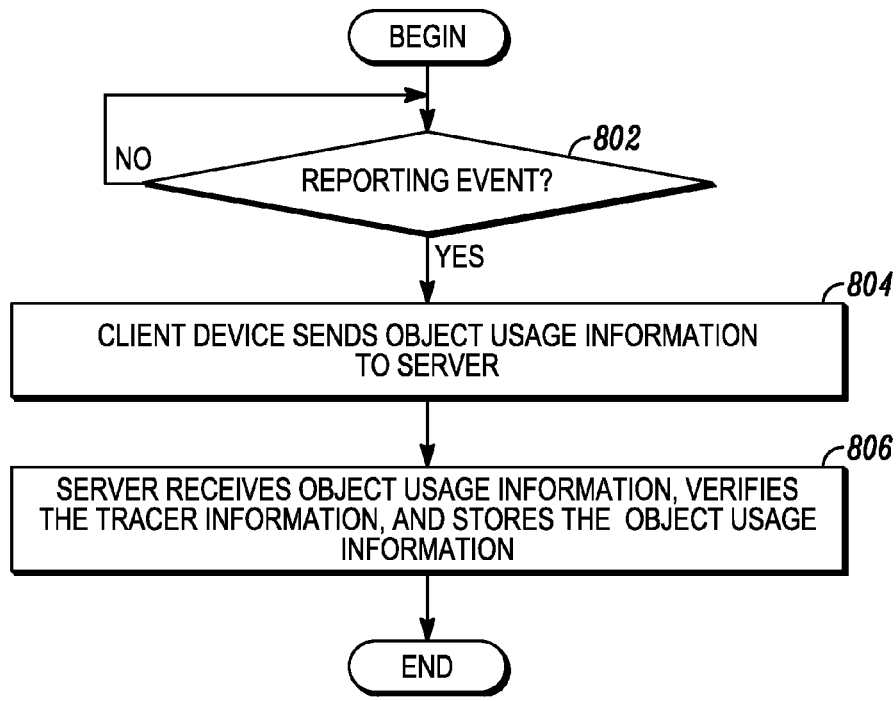
FIG. 8 is a flowchart of a method for a client device to provide information to a server, which describes traceable object-related actions performed by the client device, in accordance with an example embodiment.

As mentioned previously, a client device may, on occasion, report information describing object-related actions performed by the client device to a server (e.g., gateway 102, FIG. 1) or another system entity. FIGS. 8-11 illustrate additional details regarding a client device reporting information describing object-related actions performed by the client device. More particularly, FIG. 8 is a flowchart of a method for a client device to provide information to a server, which describes object-related actions performed by the client device, in accordance with an example embodiment. For enhanced understanding, FIG. 8 should be viewed in conjunction with FIG. 9, which is a communication flow diagram illustrating messages exchanged between system entities during the process of reporting object-related actions, in accordance with an example embodiment.

Referring first to FIG. 8, the method may begin when a client device determines that a reporting event has occurred, in block 802. In various embodiments, reporting events may be client generated, system generated or both. Client-generated reporting events may include, for example but not by way of limitation, collection of a predetermined quantity of object usage information from the time when the client device last sent a report, the object usage log on the client device reaching a predetermined size, performance of a predetermined number of object-related actions (e.g., an integer number from 1 to 1000), the elapse of a predetermined period of time (e.g., a 24-hour period or some other period of time), the client device's entry into a particular operational state (e.g., power up or idle, for example), and/or other events whose occurrence may be determined by the client device. System-generated reporting events may include, for example but not by way of limitation, the client device's receipt of a report request message from a server (e.g., gateway 102, FIG. 1) or other system entity, and/or other events whose occurrence may be initiated by the server or a system entity other than the client device. In an embodiment in which a reporting event is a system-generated reporting event, the server may send an object usage information request message to the client device, as indicated by object usage information request message 902 (FIG. 9).

Figure 9:
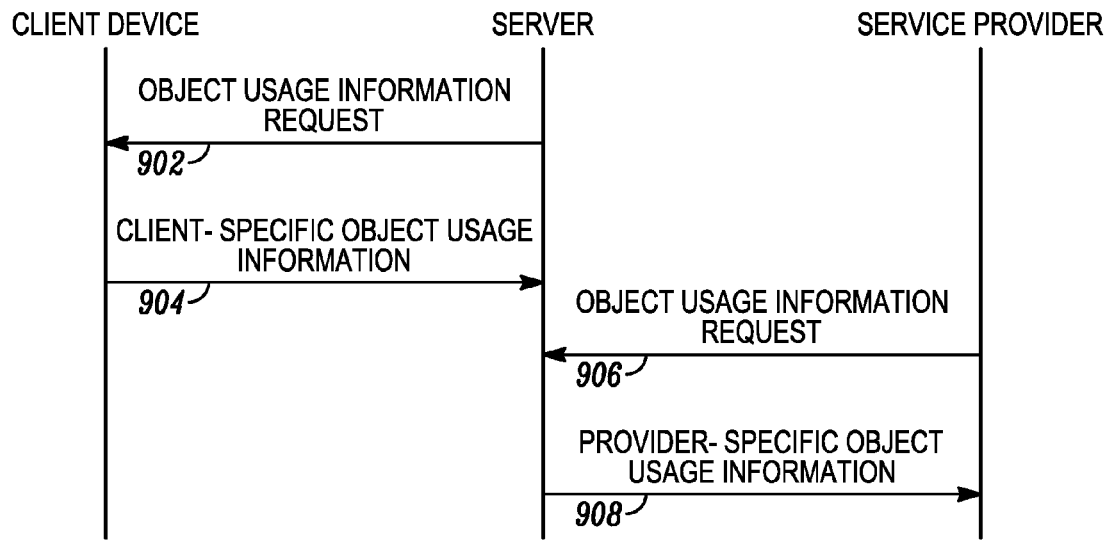
FIG. 9 is a communication flow diagram illustrating messages exchanged between system entities during the process of reporting traceable object-related actions, in accordance with an example embodiment.

When the client device has received an object usage information request message or has determined that another reporting event has occurred, the client device may send object usage information and the tracer information associated therewith to the server, in block 804, as indicated by client-specific object usage information message 904 (FIG. 9). As used herein, the term "reported tracer information" refers to tracer information that is reported to a server (or other system entity) by a client device (or other system entity), as opposed to tracer information that forms a portion of a traceable object, even though the content of this information may be (or may not be) the same. Reported tracer information that is reported from a client device to a server may more specifically be referred to as "client-reported tracer information." In an embodiment, the client device may retrieve object usage information and tracer information from the object usage log (or other data structure) stored on the client device, and may generate a message that includes the retrieved object usage information and tracer information. The retrieved object usage information and tracer information may include all or a subset of the information within the object usage log, for example. In an embodiment, the information within the object usage log that is reported either is cleared from the object usage log or is marked as having been reported. In an alternate embodiment, pointers into the object usage log may indicate blocks of data that either have or have not been reported, and the client device may permit that data that has been reported to be overwritten.

In an embodiment, the client device sends object usage information and tracer information to the server (or other system entity) in the form of a client object usage report message. The object usage information and tracer information may be sent to a server in a substantially unaltered form from how it was stored in the object usage log, or it may be sent in a reformulated format which includes more, less, and/or rearranged information. The information may be sent in a consolidated format with duplicative information removed, in an embodiment, and/or may be otherwise compressed. Finally, the information may or may not be encrypted or scrambled, prior to being sent.

Figures 10, 11:
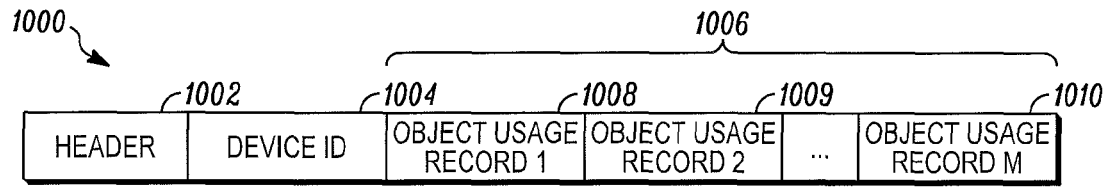
FIG. 10 is a diagram of a client traceable object usage report message, in accordance with an example embodiment.
FIG. 11 is a diagram of traceable object usage information stored within a traceable object usage tracking database, in accordance with an example embodiment.

FIG. 10 is a diagram of a client object usage report message 1000, in accordance with an example embodiment. Object usage report message 1000 may include, for example, a header field 1002, device ID field 1004, and an object usage information field 1006, which may include one or more object usage records 1008, 1009, 1010, in an embodiment.

Header field 1002 may include information that enables a determination of the type of message (e.g., an object usage report message), and a message identifier (e.g., a unique identifier of the message), among other things. In addition, header field 1002 may indicate the size of the message, the data portion of the message (e.g., the device ID field 1004 and the object usage information field 1006), and/or other information that enables a system entity to parse or decode the message.

Device ID field 1004 may include a device identifier, which uniquely identifies the client device within the network or system. Object usage information field 1006 includes indicators of object-related actions and tracers stored within the object usage log (e.g., object usage log 700, FIG. 7). In an embodiment, each of object usage records 1008-1010 may include object usage information corresponding to one or more object usage records within the object usage log. For example, each object usage record 1008-1010 may include an action, timestamp, and tracer included within one record of the object usage log. In an alternate embodiment, the object usage information field 1006 and/or each object usage record 1008-1010 may include consolidated and/or reorganized indicators of the object-related actions and tracers stored within the object usage log.

Referring again to FIG. 8, the server receives the object usage information and the client-reported tracer information (e.g., a client object usage report message) from the client device, in block 806. In an embodiment, the server may then verify the tracer information for some or all of the tracers received. In an embodiment in which the tracer information is encrypted, this may include decrypting the tracer information. In an embodiment in which the tracer information includes an integrity key, this may include evaluating the tracer information in conjunction with the integrity key to determine whether the tracer information has been modified by an unauthorized source. Assuming that the tracer information has been properly verified, the server may then store the object usage information. In an embodiment, the object usage information associated with any tracer information that has not been properly verified is not stored.

In an embodiment, the server stores object usage information and at least some of the client-reported tracer information in an object usage tracking database (e.g., traceable object usage tracking database 124, FIG. 1), and the method may end. As mentioned previously, an object usage tracking database may be a relational database (or a flat file), which includes object usage information and client-reported tracer information for a plurality of client devices. In an embodiment, the object usage information and its associated client-reported tracer information may be stored, related, and/or accessed based on any one or more parameters, including but not limited to, provider ID, sponsor ID, sponsor type, object ID, object-related action or action code, action timestamp, object instance ID, object name, client device ID, report timestamp, and/or other parameters associated with the information stored within the object usage tracking database.

FIG. 11 is a diagram of object usage information stored within an object usage tracking database 1100, in accordance with an example embodiment. Object usage tracking database 1100 may include multiple records, indicated by record numbers ("Record No.") 1 to X in column 1102. Each record may correspond to one or more object-related actions, which have been reported by client devices (e.g., in client object usage report messages 1000, FIG. 10). In an embodiment, each record includes a record number within a record number field 1102, a device ID identifying the client device that reported the information 1104, a description of the action that was performed within an action field 1106, one or more timestamps within a timestamp field 1108, and a copy of all or a portion of the client-reported tracer information that is associated with the traceable object that was acted upon, within a tracer information ("tracer info") field 1110.

In an embodiment, each time object usage information is received from a client device (e.g., in a client object usage report message 1000, FIG. 10), one or more new records are created in object usage tracking database 1100, and a then-current time is inserted into the timestamp field 1108 of the new records. The action timestamp (e.g., action timestamp 706, FIG. 7) that was reported by the client device in the object usage information also or alternatively may be inserted into the timestamp field 1108, in various embodiments.

In addition, for each record, the reported action may be indicated in the action field 1106, and tracer information that includes all or a portion of the tracer (e.g., tracer 600, FIG. 6) associated with the traceable object that was acted upon may be copied into the tracer information field 1110 of the new record. In an embodiment, the tracer information is stored in an unencrypted format (e.g., when an encrypted tracer is received, it is decrypted prior to storing the tracer information). The tracer information may include one or more IDs, which may include at least the provider ID (e.g., provider ID 606, FIG. 6), sponsor ID (e.g., sponsor ID 608, FIG. 6), and the object ID (e.g., object ID 612, FIG. 6), in an embodiment. In other embodiments, other tracer information also may be stored in the tracer information field 1110. In another embodiment, if a record has already been created for a particular traceable object (e.g., as indicated by the object ID), the record may be updated when subsequent object-related actions are reported with respect to the traceable object (e.g., additional actions may be added to the action field 1106). In still another embodiment, a record may be created only when a tracer and/or the corresponding traceable object has one or more particular characteristics. For example, when an object-related action is reported, the server may determine whether the traceable object corresponds to a sponsor entity (e.g., sponsor entity 130-134, FIG. 1), and may bypass creation of a new record when it does not. This determination may be made, for example, by the server evaluating the information within one or more fields of the tracer (e.g., tracer 600, FIG. 6).

As mentioned previously, a server may, on occasion, report information describing object-related actions performed by client devices to a service provider (e.g., service provider 114, 116, FIG. 1) or another system entity. This information may include, for example, information within the object usage tracking database 1100, FIG. 11.

FIG. 12 is a flowchart of a method for a server to provide information to a service provider, which describes object-related actions performed by one or more client devices, in accordance with an example embodiment. For enhanced understanding, FIG. 12 should be viewed in conjunction with FIG. 9, which was introduced earlier. Referring first to FIG. 12, the method may begin when a server determines that a reporting event has occurred, in block 1202. In various embodiments, reporting events may be server generated, service provider generated or both. Server-generated reporting events may include, for example but not by way of limitation, collection of a predetermined quantity of object usage information associated with a particular service provider from the time when the server last sent a report to the service provider, the elapse of a predetermined period of time (e.g., a 24-hour period or some other period of time), and/or other events whose occurrence may be determined by the server. Service provider-generated reporting events may include, for example but not by way of limitation, the server receiving a report request message from a service provider or other system entity, and/or other events whose occurrence may be initiated by the service provider or a system entity other than the server. In an embodiment in which a reporting event is a service provider-generated reporting event, the service provider may send an object usage information request message to the server, as indicated by object usage information request message 906 (FIG. 9).

When the server has determined that a reporting event has occurred, the server may retrieve and send object usage information and tracer information to the service provider, in block 1204, as indicated by service provider-specific object usage information message 908 (FIG. 9). As used herein, the term "server-reported tracer information" refers to tracer information that is reported to a service provider by a server (or other system entity), as opposed to tracer information that forms a portion of a traceable object, even though the content of this information may be (or may not be) the same. In an embodiment, the server may retrieve object usage information and tracer information from the object usage tracking database (e.g., traceable object usage tracking database 124, FIG. 1), and may generate a message that includes the retrieved object usage information and tracer information. The retrieved object usage information and tracer information may include all or a subset of the information within the object usage tracking database, for example. In an embodiment, the information within the object usage tracking database that is reported to the service provider is specific to that service provider, meaning that the object-related action information reported to the service provider corresponds to traceable objects having tracer information that includes the service provider's ID in the provider ID field (e.g., provider ID field 606, FIG. 6). Once object usage information has been reported to a service provider, it either is cleared from the object usage tracking database or is marked as having been reported. In an alternate embodiment, pointers into the object usage tracking database may indicate blocks of data that either have or have not been reported, and the server may permit that data that has been reported to be overwritten.

In an embodiment, the server sends object usage information and tracer information to the service provider (or other system entity) in the form of a service-provider object usage report message. The object usage information and tracer information may be sent to a service provider in a substantially unaltered form from how it was stored in the object usage tracking database, or it may be sent in a reformulated format which includes more, less, and/or rearranged information. The information may be sent in a consolidated format with duplicative information removed, in an embodiment, and/or may be otherwise compressed. In addition, the information may include complete, unaltered tracer information, or it may exclude certain portions of the tracer information. Finally, the information may or may not be encrypted or scrambled, prior to being sent.

In an embodiment, the server may initiate billing for the provider-specific object usage information. This may include, for example, sending information to a "server billing processor" regarding the identity of the service provider to whom the information was reported, along with information regarding the quantity and or nature of provider-specific object usage information that was reported. A server billing processor may include, for example, a processing entity associated with the server, which is adapted to evaluate "reporting information" describing reported object usage information, and to initiate billing events based on the reporting information. The term "server," as used herein, may be used interchangeably to mean a server and/or a server billing processor, which may or may not be distinct processing entities. In an embodiment, the server billing processor may initiate the generation of a billing event, which may include the generation and transmission of an electronic or paper bill to a sponsor entity, and/or the initiation of a funds transfer from the sponsor entity to the service provider. In this manner, the server may monetize its collection and provision of object-related action information to the service provider.

Referring again to FIG. 12, the service provider (or other system entity) receives the service-provider specific object usage information and server-reported tracer information (e.g., a service-provider object usage report message) from the server, in block 1206. The service provider may then verify the received object usage information.

In an embodiment, a service provider billing processor associated with the service provider may then initiate a sponsor billing event based on the received object usage information and server-reported tracer information. The term "service provider," as used herein, may be used interchangeably to mean a service provider and/or a service provider billing processor, which may or may not be distinct processing entities. For example, a service provider billing processor may determine sponsors who potentially should be billed, based on the server-reported tracer information. For example, a service provider billing processor may identify, as sponsors potentially to be billed, a set of sponsors who were identified in the server-reported tracer information of those objects that were reported as having been used. For example, these sponsors may be or may have been identified in the sponsor ID fields (e.g., sponsor ID field 608, FIG. 6) of the tracers corresponding to objects that have been used. In an alternate embodiment, the service provider billing processor may alternately or additionally initiate user billing based on the server-reported tracer information. In such an embodiment, the service provider billing processor may determine users who potentially should be billed, based on the server-reported tracer information.

Once the set of sponsor entities (and/or users) potentially to be billed have been determined, the service provider billing processor may determine billing amounts for each identified sponsor entity (and/or user) based on the object usage information. In an embodiment, the service provider billing processor may implement a tiered billing schedule to determine billing amounts for each identified sponsor entity (and/or user). For example, in an embodiment, a tiered billing structure may specify different billing amounts for different types of actions, and/or for different sponsors, and/or for different types of sponsors, and/or for different users, and/or for different server assets associated with the traceable objects.

FIG. 13 is an example of a tiered billing schedule 1300 that may be applied by a service provider billing processor (or other system entity), in accordance with an example embodiment. Various types of object-related actions are listed in the leftmost column 1302 of schedule 1300, each of which was described previously. For a first sponsor (or type of sponsor), "Sponsor A," fees (in dollars) corresponding to each type of action are listed in column 1304. Similarly, for second and third sponsors (or types of sponsors), "Sponsor B" and "Sponsor C," other fees corresponding to each type of action are listed in columns 1306 and 1308. For example, Sponsor A may correspond to one or more retail clothing stores associated with a first sponsor entity, Sponsor B may correspond to a collection of media objects that may be provided by a second sponsor entity, and Sponsor C may correspond to one or more luxury automobile dealers associated with a third sponsor entity. Each sponsor or type of sponsor may be charged different fees for different object-related actions, as mentioned above. For example fees specified in the bottom row, which corresponds to fees for an arrival instruction issued by a navigation application, may be lower for Sponsor A (retail clothing store) than for Sponsor C (luxury automobile dealership). In addition, the fees corresponding to an arrival instruction (bottom row) may be substantially higher than the fees corresponding to a receive action (top row), because the likelihood that the sponsor may realize a sale is substantially higher when a user has arrived at a sponsor location than when the user's client device has merely received a traceable object corresponding to the sponsor location. In addition, certain actions may be irrelevant (not applicable or "N/A") for certain types of traceable objects. For example, a first traceable object may be a traceable location object that indicates the location of a retail clothing store (e.g., Sponsor A) and a second traceable object may be a traceable media object. The action of physical navigation may be relevant for the traceable location object but not for the traceable media object. Conversely, the action of playing the content of a traceable object may be relevant for a traceable media object but not for a traceable location object.

Referring again to block 1206 of FIG. 12, billing amounts for each sponsor entity (and/or user) may be determined by determining and accumulating the fees for all object-related actions corresponding to each sponsor entity (and/or user), using a billing schedule, such as the tiered billing schedule of FIG. 13. In an embodiment, the service provider billing processor may initiate the generation of a billing event for each sponsor entity (and/or user), which may include the generation and transmission of an electronic or paper bill to each identified sponsor entity (and/or user), which specifies the billing amount determined for each sponsor entity (and/or user). In an alternate embodiment, a billing event may include the initiation of a funds transfer from the sponsor entity (and/or user) to the service provider, where the amount of the funds transfer may include all or a portion of the billing amount determined for the sponsor entity (and/or user). In this manner, the service provider may monetize the client device usage of the traceable objects that it initially provided.

As described previously, in an embodiment, the system may maintain usage credit values for each client device, which values may be stored and maintained on a client device (e.g., client device 103-109, FIG. 1), a gateway (e.g., gateway 102), a service provider (e.g., service providers 114, 116), and/or a sponsor entity (e.g., sponsor entities 130-134). The amounts that a usage credit value may be increased (e.g., in response to the performance of an object-related action) or decreased (e.g., in response to a redemption action) also may be specified in one or more tiered usage credit schedules (not illustrated). Similar to the tiered billing schedule of FIG. 13, a tiered usage credit schedule may specify different usage credit amounts for different types of actions, and/or for different sponsors, and/or for different types of sponsors, and/or for different users, and/or for different server assets associated with the traceable objects, and/or for different incentives.

Various embodiments may be performed on client devices (e.g., client devices 103-109, FIG. 1) and networked computers (e.g., gateway 102 and service providers 114, 116, FIG. 1), as discussed previously, and each may include hardware, firmware and software adapted to perform various functions relating to traceable objects, such as those described above. The networked computers (e.g., gateway 102 and service providers 114, 116, FIG. 1) may include centralized or distributed processing subsystems, and may also include or be adapted to access memory storage devices and systems, and/or databases. Client devices (e.g., client devices 103-109 may include various configurations of hardware, each of which is adapted to perform the functions of the particular type of client device and to communicate over one or more types of wired or wireless networks.

FIG. 14 is a simplified block diagram of a client device 1400, in accordance with an example embodiment. In an embodiment in which device 1400 is adapted to communicate over a wireless network, device 1400 includes at least one wireless network interface 1402, at least one processing subsystem 1404, at least one data storage subsystem 1406, at least one user interface (UI) input device 1408, and at least one UI output device 1410, in an embodiment. In an embodiment in which device 1400 is adapted to communicate over a wired network, device 1400 may also or alternatively include a wired network interface 1403. Device 1400 may also include a battery subsystem 1412, in an embodiment. In other embodiments, device 1400 may include one or more additional or different elements.

Wireless network interface 1402 is adapted to receive and/or transmit messages over a wireless network (e.g., a cellular network, radio network, and/or other types of wireless networks). In an embodiment, wireless network interface 1402 may include at least one antenna and other apparatus for receiving signals (e.g., messages that include traceable objects) from the air interface and for transmitting signals (e.g., messages that include object usage information) over the air interface. Wired network interface 1403 is adapted to receive and/or transmit messages over a hardwired network (e.g., the internet, a WAN, a LAN, a PSTN, and/or other types of networks). In an embodiment, wired network interface 1403 may include at least one port and other apparatus for receiving signals (e.g., messages that include traceable objects) from the wired network, and for transmitting signals (e.g., messages that include traceable object usage information) over the wired network.

Processing subsystem 1404 is adapted to perform various method embodiments, as described previously. In particular, processing subsystem 1404 is adapted to determine whether an object-related action has been performed in which a traceable object that includes tracer information has been used by the client device 1400. When an object-related action has occurred, processing subsystem 1404 may initiate storage of the tracer information and object usage information into data storage subsystem 1406.

Processing subsystem 1404 may include at least one processing device (e.g., a general purpose or special purpose processor) and additional circuitry adapted to interface processing subsystem 1404 with other elements of device 1400. Processing subsystem 1404 is operatively coupled to wireless network interface 1402 and/or wired network interface 1403, in an embodiment, and accordingly may receive data from and provide data to wireless network interface 1402 and/or wired network interface 1403. The data may include, for example, traceable objects and/or object usage information. Processing subsystem 1404 also is operatively coupled to UI input device 1408 and UI output device 1410, in an embodiment, and accordingly may receive information that indicates user inputs, and may provide information (e.g., displays depicting location information within traceable location objects, and/or audio or video output of traceable media objects).

Processing subsystem 1404 may store data to and/or retrieve data from the at least one data storage subsystem 1406. Data storage subsystem 1406 may include, for example, one or more volatile or non-volatile storage components, such as random access memory (RAM), read only memory (ROM), numerous variations of those types of memories, and/or other types of storage. In an embodiment, the at least one data storage subsystem 1406 is adapted to store information (e.g., object usage information and tracer information) regarding object-related actions performed by device 1400, and a user credit value (if it is maintained on client device 1400), among other things.

The at least one UI input device 1408 may include one or more of various devices selected from a group of UI input devices that includes, but is not limited to a microphone, keypad, keyboard, trackball, pointing device, and/or touchscreen, among other things. In an embodiment, the at least one user input device 1408 is adapted to enable the user to cause device 1400 to perform various object-related actions by providing input prompts and receiving user inputs (e.g., mouse clicks, entered data, etc.).

The at least one UI output device 1410 may include one or more of various devices selected from a group of UI output devices that includes, but is not limited to a speaker, display device, touchscreen, mechanical vibration device, and/or indicator light, among other things. In an embodiment, the at least one user output device 1410 is adapted to depict information within traceable objects, as is discussed in detail above.

The at least one battery subsystem 1412 may be configured to accept at least one rechargeable or disposable battery, in an embodiment, and accordingly may include a battery housing (not illustrated), which may hold the at least one battery. The at least one battery subsystem 1412 may be operatively coupled to any one or more of the at least one processing subsystem 1404, the at least one data storage subsystem 1406, the at least one wireless network interface 1402, the at least one wired network interface 1403, the at least one user interface input device 1408, and/or the at least one user interface output device 1410, in an embodiment, in order to provide power to these device elements. In an alternate embodiment, device 1400 may not include a battery subsystem, and instead may receive line power.

The sequence of the text in any of the claims does not imply that process steps must be performed in a temporal or logical order according to such sequence unless it is specifically defined by the language of the claim. The process steps may be interchanged in any order without departing from the scope of the inventive subject matter as long as such an interchange does not contradict the claim language and is not logically nonsensical. Furthermore, numerical ordinals such as "first," "second," "third," etc. simply denote different singles of a plurality and do not imply any order or sequence unless specifically defined by the claim language.

Furthermore, words such as "connected" or "coupled to" used in describing a relationship between different elements do not imply that a direct physical connection must be made between these elements. For example, two elements may be connected to each other physically, electronically, logically, or in any other manner, through one or more additional elements, without departing from the scope of the inventive subject matter.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the inventive subject matter.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter, it being understood that various changes may be made in the function and arrangement of elements described in an exemplary embodiment without departing from the scope of the inventive subject matter as set forth in the appended claims and their legal equivalents.

What is claimed is:

1. A communication system comprising:
    a client device adapted to receive a traceable object that includes tracer information identifying a business entity associated with the origin of the traceable object, to perform one or more of a plurality of different object-related actions using the traceable object, wherein a unique action code is associated with each of the plurality of different object-related actions, wherein each unique action code is associated with a particular type of the different object-related actions, to store, for each object-related action that has been performed using the traceable object, a record that includes object usage information and the tracer information identifying the business entity, wherein the object usage information includes the unique action code for the object-related action that has been performed by the client device using the traceable object, and to send the object usage information and an identification of the business entity from the tracer information to a server; and
    the server adapted to receive and store the object usage information.

2. The communication system of claim 1, wherein the client device further comprises:
    a data storage subsystem, wherein the client device is adapted to store the tracer information and the object usage information in a client-side object usage log within the data storage subsystem.

3. The communication system of claim 2, wherein the client device is further adapted to maintain a usage credit value in the data storage subsystem.

4. The communication system of claim 1, further comprising:
    an object usage tracking database, wherein the server is adapted to store the object usage information in a server-side object usage log within the object usage tracking database.

5. The communication system of claim 1, wherein:
    the server is further adapted to send the object usage information to a service provider, and wherein the communication system further comprises
    the service provider adapted to receive the object usage information from the server, and to initiate a billing event based on an evaluation of the object usage information and the tracer information.

6. The communication system of claim 5, wherein the service provider is further adapted to maintain usage credit values for one or more client devices.

7. The communication system of claim 1, wherein the server is further adapted to maintain usage credit values for one or more client devices.

8. A method performed by a client device, comprising the steps of:
    receiving a traceable object that includes tracer information identifying a business entity associated with the origin of the traceable object;
    performing one or more of a plurality of different object-related actions using the traceable object, wherein a unique action code is associated with each of the plurality of different object-related actions, wherein each unique action code is associated with a particular type of the different object-related actions;
    storing, for each object-related action that has been performed using the traceable object, a record that includes object usage information and the tracer information identifying the business entity, wherein the object usage information includes the unique action code for the object-related action that has been performed by the client device using the traceable object; and
    sending the object usage information and an identification of the business entity from the tracer information to a server.

9. The method of claim 8, wherein the one or more object-related actions include a play action.

10. A method performed by a client device, comprising the steps of:

receiving a traceable object that includes tracer information identifying a business entity associated with the origin of the traceable object;

performing one or more object-related actions using the traceable object, wherein the one or more object-related actions include at least one action selected from a group of actions consisting of a play action, a receive action, a call action, a view action, a map action, a send action, a save action, a search action, a physical navigation action, an arrival action, and a purchase action;

storing object usage information and the tracer information, wherein the object usage information describes the one or more object-related actions that have been performed by the client device using the traceable object; and sending the object usage information and an identification of the business entity from the tracer information to a server.

11. The method of claim 8, wherein storing the object usage information comprises:
determining that an object-related action has been performed by the client device using the traceable object; and
generating a record in a client-side object usage log, wherein the record includes an identification of the object-related action and the tracer information of the traceable object.

12. The method of claim 8, wherein at least a portion of the tracer information is encrypted tracer information, and wherein storing the object usage information in conjunction with the tracer information comprises:
storing the object usage information in conjunction with the encrypted tracer information.

13. The method of claim 8, further comprising:
after receiving the one or more traceable objects from the server, receiving an object usage information request from the server; and
sending the traceable object usage information and the tracer information to the server in response to receiving the object usage information request.

14. The method of claim 8, further comprising:
determining whether a reporting event has occurred; and
sending the object usage information and the identification of the business entity to the server when the reporting event has occurred, and wherein the reporting event is an event selected from a group of events that includes a performance of an object-related action, a collection of a predetermined quantity of object usage information, the object usage log reaching a predetermined size, a performance of a predetermined number of object-related actions, an elapse of a predetermined period of time, an entry into a particular operational state, and a receipt of a report request message from the server.

15. The method of claim 8, further comprising:
increasing a usage credit value when the client device performs an object-related action.

16. The method of claim 8, further comprising:
decreasing a usage credit value when the client device performs a redemption action.

17. A method performed by a server, comprising the steps of:
receiving a client-generated information request from a client device, wherein the information request includes parameters for obtaining information;
obtaining one or more traceable objects in response to receiving the client-generated information request, wherein a traceable object of the one or more traceable objects includes tracer information in one or more tracer fields, and the tracer information identifies a business entity associated with the origin of the traceable object;
sending the one or more traceable objects to the client device; and
receiving object usage information and client-reported tracer information that includes an identification of the business entity, wherein the object usage information includes a unique action code for each of a plurality of object-related actions that have been performed by the client device using the traceable object, wherein each unique action code is associated with a particular type of the different object-related actions.

18. The method of claim 17, further comprising:
before sending a traceable object of the one or more traceable objects to the client device, storing a provider identifier in a provider identifier field of the tracer fields.

19. The method of claim 17, further comprising:
before sending a traceable object of the one or more traceable objects to the client device, protecting the tracer information by encrypting portions of the tracer information.

20. The method of claim 17, further comprising:
before sending a traceable object of the one or more traceable objects to the client device, protecting the tracer information by storing an integrity key in a tracer protection information field of the tracer fields.

21. The method of claim 17, further comprising:
after sending the one or more traceable objects to the client device, sending an object usage information request to the client device, wherein the traceable object usage information and the client-reported tracer information is received from the client device in response to the object usage information request.

22. The method of claim 17, further comprising:
validating the client-reported tracer information.

23. The method of claim 17, further comprising:
maintaining usage credit values for one or more client devices.

24. A client device comprising:
a processing subsystem adapted to determine whether one or more of a plurality of different object-related actions have been performed by the client device using a traceable object that includes tracer information, wherein a unique action code is associated with each of the plurality of different object-related actions, wherein each unique action code is associated with a particular type of the different object-related actions, and when an object-related action has been performed, to initiate storage of a record that includes the tracer information and object usage information into a data storage subsystem, wherein the object usage information includes the unique action code for the object-related action that has been performed by the client device using the traceable object, and the tracer information identifies a business entity associated with the origin of the traceable object;
the data storage subsystem adapted to store the object usage information and the tracer information; and
a network interface adapted to receive the traceable object, and to transmit one or more messages that include the object usage information and an identification of the business entity in the tracer information over a network.

25. The client device of claim 24, further comprising:
at least one user interface input device adapted to enable a user to cause the client device to perform the object-related action; and at least one user interface output device adapted to depict information within the traceable object.

26. The client device of claim 24, wherein the client device forms a portion of any one or more electronic devices selected from a group of devices that includes a cellular telephone, a radio, a pager, a mobile computer system, a personal data assistant, a personal navigation device, and a computer.

27. The method of claim 8, wherein the business entity is a sponsor entity that provides products or services.

28. A method performed by a client device, comprising the steps of:
receiving a traceable object that includes tracer information identifying a business entity associated with the origin of the traceable object;
performing one or more object-related actions using the traceable object, wherein each of the one or more object-related actions is an action selected from a group consisting of receiving the traceable object, saving the traceable object, sending the traceable object to another client device, outputting content in the traceable object on an output device of the client device, initiating a telephone call to a telephone number represented in the traceable object, displaying a map that indicates a physical location represented in the traceable object, initiating an instance of a navigation application to provide navigation instructions to the physical location represented in the traceable object, determining that the client device has arrived at the physical location represented in the traceable object, purchasing a product or service represented in the traceable object, and initiating a search algorithm using information in the traceable object;
storing object usage information and the tracer information, wherein the object usage information describes the one or more object-related actions that have been performed by the client device using the traceable object; and
sending the object usage information and an identification of the business entity from the tracer information to a server.

29. The method of claim 8, wherein the traceable object is an object selected from a group consisting of a media object, a link object, a location object, an advertisement object, and an information object.

* * * * *

UNITED STATES PATENT AND TRADEMARK OFFICE
CERTIFICATE OF CORRECTION

| | | |
|---|---|---|
| PATENT NO. | : 8,489,576 B2 | |
| APPLICATION NO. | : 12/054154 | |
| DATED | : July 16, 2013 | |
| INVENTOR(S) | : David B. Harris et al. | |

It is certified that error appears in the above-identified patent and that said Letters Patent is hereby corrected as shown below:

In the Claims

Column 29, line 60, through column 30, line 13, should read as follows:
1. A communication system comprising: a client device comprising a processor adapted to receive a traceable object that includes tracer information identifying a business entity associated with the origin of the traceable object, to perform one or more of a plurality of different object-related actions using the traceable object, wherein a unique action code is associated with each of the plurality of different object-related actions, wherein each unique action code is associated with a particular type of the different object-related actions, to store, for each object-related action that has been performed using the traceable object, a record that includes object usage information and the tracer information identifying the business entity, wherein the object usage information includes the unique action code for the object-related action that has been performed by the client device using the traceable object, and to send the object usage information and an identification of the business entity from the tracer information to a server; and the server adapted to receive and store the object usage information.

Column 30, line 66, through column 31, line 18, should read as follows:
10. A method performed by a client device, comprising the steps of: receiving a traceable object that includes tracer information identifying a business entity associated with the origin of the traceable object, performing one or more object-related actions using the traceable object, wherein a unique action code is associated with each of the plurality of different object-related actions, wherein each unique action code is associated with a particular type of the different object-related actions, and wherein the one or more object-related actions include at least one action selected from the group of actions consisting of a play action, a receive action, a call action, a view action, a map action, a send action, a save action, a search action, a physical navigation action, an arrival action, and a purchase action; storing, for each object-related action that has been performed using the traceable object, a record that includes object usage information and the tracer information identifying the business entity, wherein the object usage information includes the unique action code for the object-related action that has been performed by the client device using the traceable object, and sending the object usage information and an identification of the business entity from the tracer information to a server.

Signed and Sealed this
Eleventh Day of March, 2014

Michelle K. Lee
*Deputy Director of the United States Patent and Trademark Office*

CERTIFICATE OF CORRECTION (continued)
U.S. Pat. No. 8,489,576 B2

Column 31, line 60, through column 32, line 13, should read as follows:

17. A method performed by a server comprising a processor, the method comprising the steps of: receiving a client-generated information request from a client device, wherein the information request includes parameters for obtaining information; obtaining one or more traceable objects in response to receiving the client-generated information request, wherein a traceable object of the one or more traceable objects includes tracer information in one or more tracer fields, and the tracer information identifies a business entity associated with the origin of the traceable object; sending the one or more traceable objects to the client device; and receiving object usage information and client-reported tracer information that includes an identification of the business entity, wherein the object usage information includes a unique action code for each of a plurality of object-related actions that have been performed by the client device using the traceable object, wherein each unique action code is associated with a particular type of the different object-related actions.

Column 32, lines 41-63, should read as follows:

24. A client device comprising: a processing subsystem comprising a processor adapted to determine whether one or more of a plurality of different object-related actions have been performed by the client device using a traceable object that includes tracer information, wherein a unique action code is associated with each of the plurality of different object-related actions, wherein each unique action code is associated with a particular type of the different object-related actions, and when an object-related action has been performed, to initiate storage of a record that includes the tracer information and object usage information into a data storage subsystem, wherein the object usage information includes the unique action code for the object-related action that has been performed by the client device using the traceable object, and the tracer information identifies a business entity associated with the origin of the traceable object; the data storage subsystem adapted to store the object usage information and the tracer information; and a network interface adapted to receive the traceable object, and to transmit one or more messages that include the object usage information and an identification of the business entity in the tracer information over a network.

Column 33, line 10, through column 34, line 17, should read as follows:

28. A method performed by a client device comprising a processor, the method comprising the steps of: receiving a traceable object that includes tracer information identifying a business entity associated with the origin of the traceable object; performing one or more object-related actions using the traceable object, wherein each unique action code is associated with a particular type of the different object-related actions, wherein each unique action code is associated with a particular type of the different object-related actions, and wherein each of the one or more object-related actions is an action selected a group consisting of receiving the traceable object, saving the traceable object, sending the traceable object to another client device, outputting content in the traceable object on an output device of the client device, initiating a telephone call to a telephone number represented in the traceable object, displaying a map that indicates a physical location represented in the traceable object, initiating an instance of a navigation application to provide navigation instructions to the physical location represented in the traceable object, determining that the client device has arrived at the physical location represented in the traceable object, purchasing a product or service represented in the traceable object, and initiating a search algorithm using information in the traceable object; storing for each object-related action that has been performed using the traceable object, a record that includes object usage information and the tracer information identifying the business entity, wherein the object usage information includes the unique action code for the object-related action that has been performed by the client device using the traceable object; and sending the object usage information and an identification of the business entity from the tracer information to a server.